US011954217B2

(12) United States Patent
Stoler et al.

(10) Patent No.: US 11,954,217 B2
(45) Date of Patent: Apr. 9, 2024

(54) SECURING PRIVILEGED VIRTUALIZED EXECUTION INSTANCES

(71) Applicant: CyberArk Software Ltd., Petach-Tikva (IL)

(72) Inventors: Nimrod Stoler, Zoran (IL); Lavi Lazarovitz, Petach-Tikva, IL (US)

(73) Assignee: CyberArk Software Ltd., Petach-Tikva (IL)

( * ) Notice: Subject to any disclaimer, the term of this patent is extended or adjusted under 35 U.S.C. 154(b) by 272 days.

(21) Appl. No.: 16/950,006

(22) Filed: Nov. 17, 2020

(65) Prior Publication Data

US 2021/0073406 A1 Mar. 11, 2021

Related U.S. Application Data

(63) Continuation of application No. 16/837,625, filed on Apr. 1, 2020, now Pat. No. 10,878,119, which is a
(Continued)

(51) Int. Cl.
*G06F 21/31* (2013.01)
*G06F 9/455* (2018.01)
(Continued)

(52) U.S. Cl.
CPC ...... *G06F 21/6218* (2013.01); *G06F 9/45558* (2013.01); *G06F 11/0772* (2013.01);
(Continued)

(58) Field of Classification Search
CPC ............ G06F 21/6218; G06F 9/45558; G06F 21/31; G06F 11/301; G06F 11/0772;
(Continued)

(56) References Cited

U.S. PATENT DOCUMENTS 7,849,502 B1 12/2010 Bloch
8,813,233 B1 8/2014 Wilson
(Continued)

OTHER PUBLICATIONS

Cyberark, Threat Research Blog Post, How I Hacked Play-with-Docker and Remotely Ran Code on the Host, Nimrod Stoler (Jan. 14, 2019) (7 pages).
(Continued)

*Primary Examiner* — Jahangir Kabir
(74) *Attorney, Agent, or Firm* — Finnegan, Henderson, Farabow, Garrett & Dunner, LLP

(57) ABSTRACT

Disclosed embodiments relate to systems and methods for securely provisioning sensitive data elements to virtualized execution instances. The techniques may include: identifying a request to provision a new virtualized execution instance; determining, in association with the request, that the new virtualized execution instance will require a prohibited data element in order to communicate with a target network resource; without providing the new virtualized execution instance the prohibited data element, registering the new virtualized execution instance; identifying a request from the new virtualized execution instance to communicate with the target network resource: performing a verification process for the request to communicate with the target network resource; and conditional on the verification process, provisioning the prohibited data element to the new virtualized execution instance.

20 Claims, 22 Drawing Sheets

Related U.S. Application Data continuation-in-part of application No. 16/451,680, filed on Jun. 25, 2019, now Pat. No. 10,735,430, which is a continuation-in-part of application No. 16/390,542, filed on Apr. 22, 2019.

(51) Int. Cl.
*G06F 11/07* (2006.01)
*G06F 11/30* (2006.01)
*G06F 21/62* (2013.01)

(52) U.S. Cl.
CPC ............ *G06F 11/301* (2013.01); *G06F 21/31* (2013.01); *G06F 2009/45562* (2013.01); *G06F 2009/45587* (2013.01); *G06F 2009/45591* (2013.01); *G06F 2009/45595* (2013.01)

(58) Field of Classification Search
CPC ............ G06F 2009/45595; G06F 2009/45587; G06F 2009/45591; G06F 2009/45562
USPC .................................................. 726/25–27
See application file for complete search history.

(56) References Cited

U.S. PATENT DOCUMENTS

| | | | |
|---|---|---|---|
| 9,104,859 | B1 | 8/2015 | Banerjee |
| 9,729,579 | B1 | 8/2017 | Mariano et al. |
| 9,805,190 | B1* | 10/2017 | Roth ................ G06F 21/55 |
| 2009/0133001 | A1 | 5/2009 | Rozenfeld |
| 2009/0249457 | A1 | 10/2009 | Graff |
| 2010/0122343 | A1 | 5/2010 | Ghosh |
| 2013/0268757 | A1 | 10/2013 | Kulkarni |
| 2014/0082350 | A1 | 3/2014 | Zarfoss |
| 2015/0163206 | A1 | 6/2015 | McCarthy et al. |
| 2015/0269383 | A1 | 9/2015 | Lang |
| 2015/0324571 | A1 | 11/2015 | Hernoud |
| 2016/0359955 | A1 | 12/2016 | Gill |
| 2017/0116415 | A1 | 4/2017 | Stopel |
| 2017/0134476 | A1 | 5/2017 | Palanivel |
| 2017/0147811 | A1 | 5/2017 | Angelsmark |
| 2017/0279826 | A1 | 9/2017 | Mohanty |
| 2017/0300430 | A1 | 10/2017 | Kataria |
| 2017/0374106 | A1* | 12/2017 | Hamou ............... H04L 41/0803 |
| 2018/0027006 | A1 | 1/2018 | Zimmermann |
| 2018/0095739 | A1 | 4/2018 | Baset |
| 2018/0144123 | A1 | 5/2018 | Levin |
| 2019/0392150 | A1 | 12/2019 | Shevade |

OTHER PUBLICATIONS

Jim Fisher, How to create an SSH certificate authority, https://jameshfisher.com/2018/03/16/how-to-create-an-ssh-certificate-authority/ (6 pages).
Using a CA with SSH, https://www.lorier.net/docs/ssh-ca.html (3 pages).
Jérôme Petazzoni, ~jpetazzo/If you run SSHD in your Docker containers, you're doing it wrong!, https://jpetazzo.github.io/2014/06/23/docker-ssh-considered-evil/ (6 pages).
Communication and Extended European Search Report dated Dec. 5, 2019, issued from the European Patent Office in corresponding Application No. 19177788.7-2018 (8 pages).

* cited by examiner

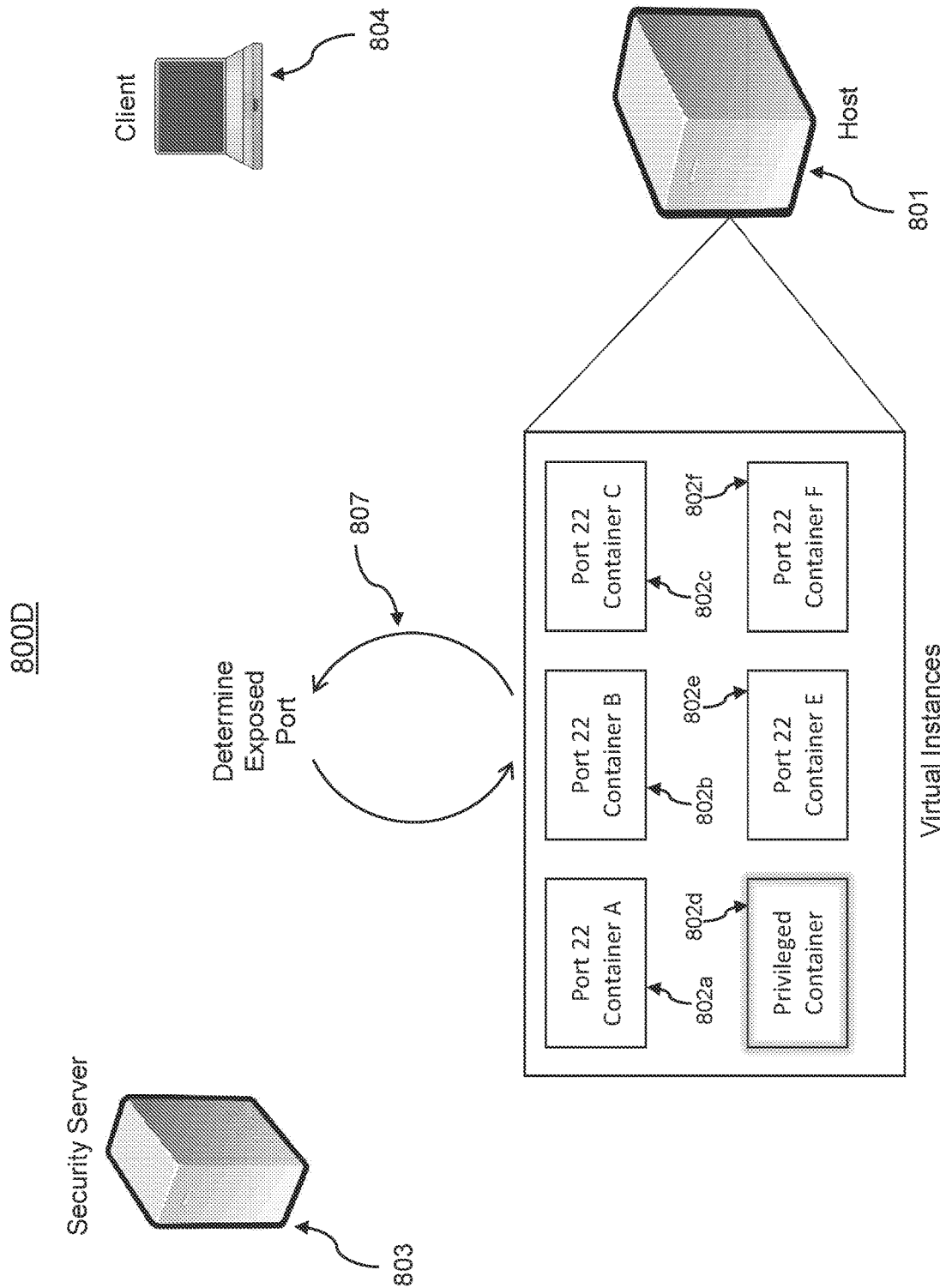

SECURING PRIVILEGED VIRTUALIZED EXECUTION INSTANCES

CROSS-REFERENCE TO RELATED APPLICATIONS

This application is a continuation of U.S. application Ser. No. 16/837,625, filed on Apr. 1, 2020, currently pending, which is a continuation-in-part of U.S. application Ser. No. 16/451,680, filed on Jun. 25, 2019, which issued as U.S. Pat. No. 10,735,430, which in turn is a continuation-in-part of U.S. application Ser. No. 16/390,542, filed on Apr. 22, 2019, currently pending. Each of the foregoing applications are incorporated by reference herein in their entirety.

BACKGROUND

In recent years, there has been increasing movement away from traditional on-premises computer networks toward cloud-based or virtual computer networks. Use of virtual machines, containers, and even serverless code has proliferated and become an integral part of IT infrastructure for all types of businesses, government agencies, and educational institutions. Through platform offerings such as Software-as-a-Service (SaaS), Infrastructure-as-a-Service (IaaS), and Platform-as-a-Service (PaaS), enterprises and other institutions are able to remotely store, process, and access data and software to run their operations.

At the same time, efficient and flexible development and deployment processes for software have become increasingly popular. Practices such as DevOps, continuous integration, and continuous deployment have been more prevalently used by enterprises and other entities to shorten the time between code changes and code deployment, resulting in more agile and optimized software products and services. Many of these practices are integrated into cloud-based, virtual computing environments.

The expanding use of virtualized computing frameworks presents significant security risks. From the perspective of the enterprise using a virtualized network, there are risks that their applications may be wrongfully accessed, modified, or used. Examples include privilege escalation attacks, denial of service attacks, corporate espionage, and others. From the cloud host's perspective, additional risks include attackers escalating privileges such that they can gain access to the host system itself or access sensitive data (e.g., data available on the host system or externally). When an attacker can, for example, "escape" from a virtual machine or container and penetrate the underlying host system, the attacker can potentially cause widespread damage throughout the entire host system, potentially affecting numerous enterprises using the host for cloud services. From the perspective of individuals and entities having sensitive or confidential data stored in the cloud, additional risks are that their data may be improperly accessed, improperly shared, or improperly deleted.

Additional vulnerabilities arise when identities (e.g., human users, applications, etc.) need to access a running virtual computing instance, such as a database, server, storage device, application, or another identity. This may happen, for example, when IT personnel or website developers need to access running and operational instances, or when automated or machine-based processes attempt to access instances as part of their functionality (e.g., backups, debugging, DevOps, file fixes or changes, database maintenance, process restarting, content editing, software updates, etc.). When access to running and operational virtual instances is performed, the access is often provided via a command such as "docker exec" or "docker cp," which are run on a host (e.g., a host deploying the virtual instances). Running such commands on a host can cause security dangers. Allowing identities to access a host system (e.g., via an SSH connection or other secure connection) in these manners involves access to the host daemon (e.g., a Docker™ daemon), which is equivalent to accessing root privileges on the host system. With this deep level of access to the host, an identity can perform various security-sensitive actions, such as instantiating new virtual instances (some of which may be privileged instances), accessing existing instances (some of which may also be privileged), or even taking over control of the host system itself.

For these reasons, current industry practices counsel against allowing access to running and operational virtual instances. Instead, conventional practices use immutable virtual instances. Once virtual instances are spun up, they should not be accessed. Nevertheless, this leads to many practical problems in terms of system operations. If security policies forbid accessing a running virtual instance, other identities may be unable to perform their functionality if they need to access the instance. Similarly, the instance itself may be severely limited in its functionality and usefulness if access to it is restricted.

Accordingly, in view of the significant security vulnerabilities that arise with the growing popularity of cloud-based services, technological solutions are needed for addressing the ability of users or applications to "escape" from permitted virtualized and isolated instances, and improperly penetrate host systems and other virtualized environments served by the host systems. Technological solutions are needed for identifying privileged virtual instances, which have parameters or configurations (e.g., based on flags, permissions, credentials, etc.) giving them privileged access sufficient to access an underlying host system. Existing approaches, which attempt to identify malicious communications and actions of virtual instances, are insufficient because they are unable to detect privileged virtual instances before malicious activity occurs. Such techniques are powerless to detect risks that virtual instances will exploit an underlying host system and/or other privileged instances being supported by the host system.

As described herein, technological solutions are needed to identify the attempted creation of privileged virtual instances, before they are able to penetrate host systems and cause harm to the host or other cloud-based entities served by the host. Additionally, technological solutions are needed for controlling the creation, deployment, and operations of virtual instances that may have, or may obtain, privileged capabilities. As described further below, investigative and predictive processes may be used to determine whether a virtual instance is to be deployed with privileged capabilities, or may gain such capabilities in the future. For such privileged instances, controls are provided for preventing the deployment of the instances, limiting their capabilities to remove privilege escalation risks, generating alerts or reports, or generating prompts requiring authentication (e.g., single-factor, two-factor, etc.) or authorization (e.g., from a manager, administrator, etc.).

Additionally, technological solutions are needed for enrolling newly instantiated virtual instances and managing secure access to them from identities. As discussed in greater detail below, when a privilege level or score for a newly spun up instance is determined, that level or score may advantageously be used to determine whether to automatically enroll the instance and permit access to it. For instances posing low privilege threats (e.g., non-privileged instances), a cryptographic key may be provisioned to the instance for use in later verifying a signature asserted by an identity requesting access to the instance. For example, an identity may receive a private/public key pair, which may be signed in a manner where the instance can verify the signature using the key it received. Upon a successful signature verification, a secure session (e.g., SSH session, etc.) may be established between the requesting identity and the instance. For newly spun up instances that are determined to pose privilege risks, automatic enrollment may be declined, and instead additional security review may be applied.

In addition, for new virtual instances, a system administrator may wish to load a container with special assets, such as files and directories copied from the host to the container. However, a container policy may strictly deny such requests to include special assets inside the container because those containers may become privileged and break the isolation between container and the system. Accordingly, techniques are needed to manage new instance access to privileged assets and to securely provision sensitive data elements.

SUMMARY

The disclosed embodiments describe non-transitory computer readable media, systems, and methods for identifying vulnerabilities for virtualized execution instances to escape their operating environment and threaten a host environment. For example, in an exemplary embodiment, there may be a non-transitory computer readable medium including instructions that, when executed by at least one processor, cause the at least one processor to perform operations for identifying vulnerabilities for virtualized execution instances to escape their operating environment and threaten a host environment. The operations may comprise identifying a virtualized execution instance configured for deployment on a host in a virtual computing environment; performing a privileged configuration inspection for the virtualized execution instance, the privileged configuration inspection analyzing whether the virtualized execution instance has been configured with one or more attributes that can permit operation of the virtualized execution instance to perform operations, beyond an environment of the virtualized execution instance, on an environment of the host; and implementing, based on the privileged configuration inspection, a control action for controlling the virtualized execution instance's ability to perform operations on the environment of the host.

According to a disclosed embodiment, the virtualized execution instance is a container instance.

According to a disclosed embodiment, the privileged configuration inspection includes identifying a second virtualized execution instance accessible to the virtualized execution instance, and analyzing whether the second virtualized execution instance has been configured with one or more attributes that can permit operations on the environment of the host.

According to a disclosed embodiment, the virtualized execution instance has not been deployed for execution in the virtual computing environment.

According to a disclosed embodiment, the one or more attributes include a configuration parameter for the virtualized execution instance.

According to a disclosed embodiment, the one or more attributes include a hardware configuration of the host.

According to a disclosed embodiment, performing the privileged configuration inspection includes using a file system debugger to attempt to access a directory of the host.

According to a disclosed embodiment, the operations further comprise, conditional on performing the privileged configuration inspection during a docker phase of the virtualized execution instance, deploying the virtualized execution instance.

According to a disclosed embodiment, the operations further comprise, conditional on performing the privileged configuration inspection upon a request to deploy the virtualized execution instance, deploying the virtualized execution instance.

According to a disclosed embodiment, the operations further comprise, conditional on performing the privileged configuration inspection upon a request to create the virtualized execution instance, deploying the virtualized execution instance.

According to another disclosed embodiment, a method may be implemented for identifying vulnerabilities for virtualized execution instances to escape their operating environment and threaten a host environment. The method may comprise identifying a virtualized execution instance configured for deployment on a host in a virtual computing environment; performing a privileged configuration inspection for the virtualized execution instance, the privileged configuration inspection analyzing whether the virtualized execution instance has been configured with one or more attributes that can permit operation of the virtualized execution instance to perform operations, beyond an environment of the virtualized execution instance, on an environment of the host; and implementing, based on the privileged configuration inspection, a control action for controlling the virtualized execution instance's ability to perform operations on the environment of the host.

According to a disclosed embodiment, the method further comprises detecting a runtime operation by the virtualized execution instance and, upon detecting the runtime operation, performing a further privileged configuration inspection for the virtualized execution instance.

According to a disclosed embodiment, the runtime operation involves an inspection of the host.

According to a disclosed embodiment, the runtime operation involves an inspection of hardware of the host.

According to a disclosed embodiment, the runtime operation involves an attempt to access a root directory of the host.

According to a disclosed embodiment, the runtime operation involves an attempt to execute code on the host.

According to a disclosed embodiment, performing the privileged configuration inspection includes using a file system debugger to attempt to access a directory of the host.

According to a disclosed embodiment, the method further comprises, conditional on performing the privileged configuration inspection during a docker phase of the virtualized execution instance, deploying the virtualized execution instance.

According to a disclosed embodiment, the runtime operation involves a write operation on the host.

According to a disclosed embodiment, the one or more attributes include a configuration parameter for the virtualized execution instance.

The disclosed embodiments additionally describe non-transitory computer readable media, systems, and methods for dynamically analyzing and enrolling virtualized execution instances. For example, in an exemplary embodiment, there may be a non-transitory computer readable medium including instructions that, when executed by at least one processor, cause the at least one processor to perform operations for dynamically analyzing and enrolling virtualized execution instances. The operations may comprise identifying a request for enrollment for a virtualized execution instance configured to be deployed on a host in a virtual computing environment, the request including a result of a privileged configuration inspection for the virtualized execution instance; wherein the privileged configuration inspection is based on whether the virtualized execution instance has been configured with one or more attributes that can permit operation of the virtualized execution instance to access sensitive data or to perform operations, beyond an environment of the virtualized execution instance, on an environment of the host; determining, based on the result of the privileged configuration inspection, to automatically enroll the virtualized execution instance; and including the virtualized execution instance in a group of enrolled virtualized execution instances, the group being available for secure communications with one or more clients in a manner that is isolated from the host.

According to a disclosed embodiment, the operations further comprise dynamically assigning a port number to the virtualized execution instance.

According to a disclosed embodiment, the operations further comprise: adaptively creating, at least in part based on the dynamically assigned port number, a set of one or more virtualized execution instances comprising emulation data indicative of at least one fictive information resource, the set being available for instantiation in the virtual computing environment; and assigning the set of virtualized execution instances with corresponding port numbers within a range of port numbers associated with the virtualized execution instance.

According to a disclosed embodiment, the operations further comprise: identifying suspicious activity associated with the set of one or more virtualized execution instances; and triggering, based on the identifying, a control action comprising at least one of: revoking enrollment of the set of one or more virtualized execution instances, controlling access to the set of one or more virtualized execution instances, or triggering an alert.

According to a disclosed embodiment, based on the virtualized execution instance being included in the group of enrolled instances, permitted operations of the virtualized execution instance with the one or more clients are limited to an isolated area of the virtualized execution instance.

According to a disclosed embodiment, the group of enrolled virtualized execution instances are restricted to direct access by the one or more clients in a manner that is isolated from the environment of the host and isolated from others of the group of enrolled virtualized execution instances.

According to a disclosed embodiment, during a runtime phase of the virtualized execution instance following the automatic enrollment of the virtualized execution instance, the operations further comprise: prompting a runtime privileged configuration inspection for the virtualized execution instance, wherein the runtime privileged configuration inspection is adaptive to a dynamic state of the virtualized execution instance; and determining, based on the runtime privileged configuration inspection, whether to perform at least one of: revoking the enrollment of the virtualized execution instance, controlling access to the virtualized execution instance, or triggering an alert.

According to a disclosed embodiment, the virtualized execution instance is configured to participate in the secure communications with the one or more clients without use of a secret in the virtualized execution instance.

According to a disclosed embodiment, the operations further comprise transmitting to the virtualized execution instance a cryptographic key for use in secure communications between the virtualized execution instance and the one or more clients.

According to a disclosed embodiment, the cryptographic key is transmitted to the virtualized execution instance on a just-in-time basis, and wherein the cryptographic key is configured to expire after a period of time.

According to a disclosed embodiment, the privileged configuration inspection is performed as part of a process of initializing the virtualized execution instance.

According to another disclosed embodiment, a method may be implemented for dynamically analyzing and enrolling virtualized execution instances. The method may comprise identifying a request for enrollment for a virtualized execution instance configured to be deployed on a host in a virtual computing environment, the request including a result of a privileged configuration inspection for the virtualized execution instance; wherein the privileged configuration inspection is based on whether the virtualized execution instance has been configured with one or more attributes that can permit operation of the virtualized execution instance to access sensitive data or to perform operations, beyond an environment of the virtualized execution instance, on an environment of the host; determining, based on the result of the privileged configuration inspection, to automatically enroll the virtualized execution instance; and including the virtualized execution instance in a group of enrolled virtualized execution instances, the group being available for secure communications with one or more clients in a manner that is isolated from the host.

According to a disclosed embodiment, the method further comprises receiving, from the one or more clients, a request to connect to the virtualized execution instance.

According to a disclosed embodiment, the method further comprises sending, to the one or more clients, a private-public key pair, wherein a public key from the private-public key pair is signed using a private key associated with a digital certificate.

According to a disclosed embodiment, the cryptographic key transmitted to the virtualized execution instance is a public key corresponding to the private key associated with the digital certificate.

According to a disclosed embodiment, the private-public key pair is configured to expire upon a determined event.

According to a disclosed embodiment, the virtualized execution instance is configured to verify a signature associated with the cryptographic key.

According to a disclosed embodiment, conditional on successfully verifying the signature associated with the cryptographic key, the virtualized execution instance is configured to engage in a secure connection session with the one or more clients.

According to a disclosed embodiment, the method further comprises monitoring and auditing the secure connection session between the virtualized execution instance and the one or more clients.

According to a disclosed embodiment, the method further comprises determining to disconnect the secure connection session between the virtualized execution instance and the one or more clients.

Other disclosed embodiments describe non-transitory computer readable media, systems, and methods for securely provisioning sensitive data elements to virtualized execution instances. For example, in an exemplary embodiment, there may be a non-transitory computer readable medium including instructions that, when executed by at least one processor, cause the at least one processor to perform operations for securely provisioning sensitive data elements to virtualized execution instances. The operations may comprise: identifying a request to provision a new virtualized execution instance; determining, in association with the request, that the new virtualized execution instance will require a prohibited data element in order to communicate with a target network resource; without providing the new virtualized execution instance the prohibited data element, registering the new virtualized execution instance; identifying a request from the new virtualized execution instance to communicate with the target network resource; performing a verification process for the request to communicate with the target network resource; and conditional on the verification process, provisioning the prohibited data element to the new virtualized execution instance.

According to a disclosed embodiment, the identifying of the request to provision the new virtualized execution instance occurs as part of monitoring requests to instantiate new virtual execution instances.

According to a disclosed embodiment, the prohibited data element is at least one of: a secret, a file, a directory, or a device.

According to a disclosed embodiment, identifying the request from the new virtualized execution instance to communicate with the target network resource includes intercepting the request.

According to a disclosed embodiment, the verification process includes authenticating the new virtualized execution instance.

According to a disclosed embodiment, the verification process includes verifying privileged access rights associated with the new virtualized execution instance.

According to a disclosed embodiment, provisioning the prohibited data element to the new virtualized execution instance includes mounting the prohibited data element in the new virtualized execution instance.

According to a disclosed embodiment, the prohibited data element is provisioned to the new virtualized execution instance on a just-in-time basis.

According to a disclosed embodiment, the operations further comprise applying access controls to the new virtualized execution instance while the prohibited data element is provisioned for the new virtualized execution instance.

According to a disclosed embodiment, the operations further comprise: detecting a termination of a session between the new virtualized execution instance and the target network resource; and automatically deprovisioning the prohibited data element for the new virtualized execution instance.

According to another disclosed embodiment, a method may be implemented for securely provisioning sensitive data elements to virtualized execution instances. The method may comprise: identifying a request to provision a new virtualized execution instance: determining, in association with the request, that the new virtualized execution instance will require a prohibited data element in order to communicate with a target network resource; without providing the new virtualized execution instance the prohibited data element, registering the new virtualized execution instance; identifying a request from the new virtualized execution instance to communicate with the target network resource; performing a verification process for the request to communicate with the target network resource; and conditional on the verification process, provisioning the prohibited data element to the new virtualized execution instance.

According to a disclosed embodiment, determining that the new virtualized execution instance will require the prohibited data element includes inspecting parameters of the request to provision the new virtualized execution instance.

According to a disclosed embodiment, determining that the new virtualized execution instance will require the prohibited data element includes identifying an error associated with an attempt to provision the new virtualized execution instance with the prohibited data element.

According to a disclosed embodiment, the method further comprises locking a memory associated with the new virtualized execution instance while the new virtualized execution instance has access to the prohibited data element.

According to a disclosed embodiment, the method further comprises prohibiting the new virtualized execution instance from entering a debugging mode while the new virtualized execution instance has access to the prohibited data element.

According to a disclosed embodiment, the method further comprises blocking other processes from accessing the new virtualized execution instance while the new virtualized execution instance has access to the prohibited data element.

According to a disclosed embodiment, the identifying of the request to provision the new virtualized execution instance occurs as part of a scanning process in a virtualized network environment.

According to a disclosed embodiment, the method further comprises, upon detecting a termination of a session between the new virtualized execution instance and the target network resource, unmounting the prohibited data element from the new virtualized execution instance.

According to a disclosed embodiment, the method further comprises, upon detecting a termination of a session between the new virtualized execution instance and the target network resource, denying access to the prohibited data element by the new virtualized execution instance.

According to a disclosed embodiment, the method further comprises monitoring and auditing activities of the new virtualized execution instance while the new virtualized execution instance has access to the prohibited data element.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIGS. 8A-8G illustrate block diagrams of an exemplary system for dynamically analyzing and enrolling virtualized execution instances in accordance with disclosed embodiments.

DETAILED DESCRIPTION

Figure 1:
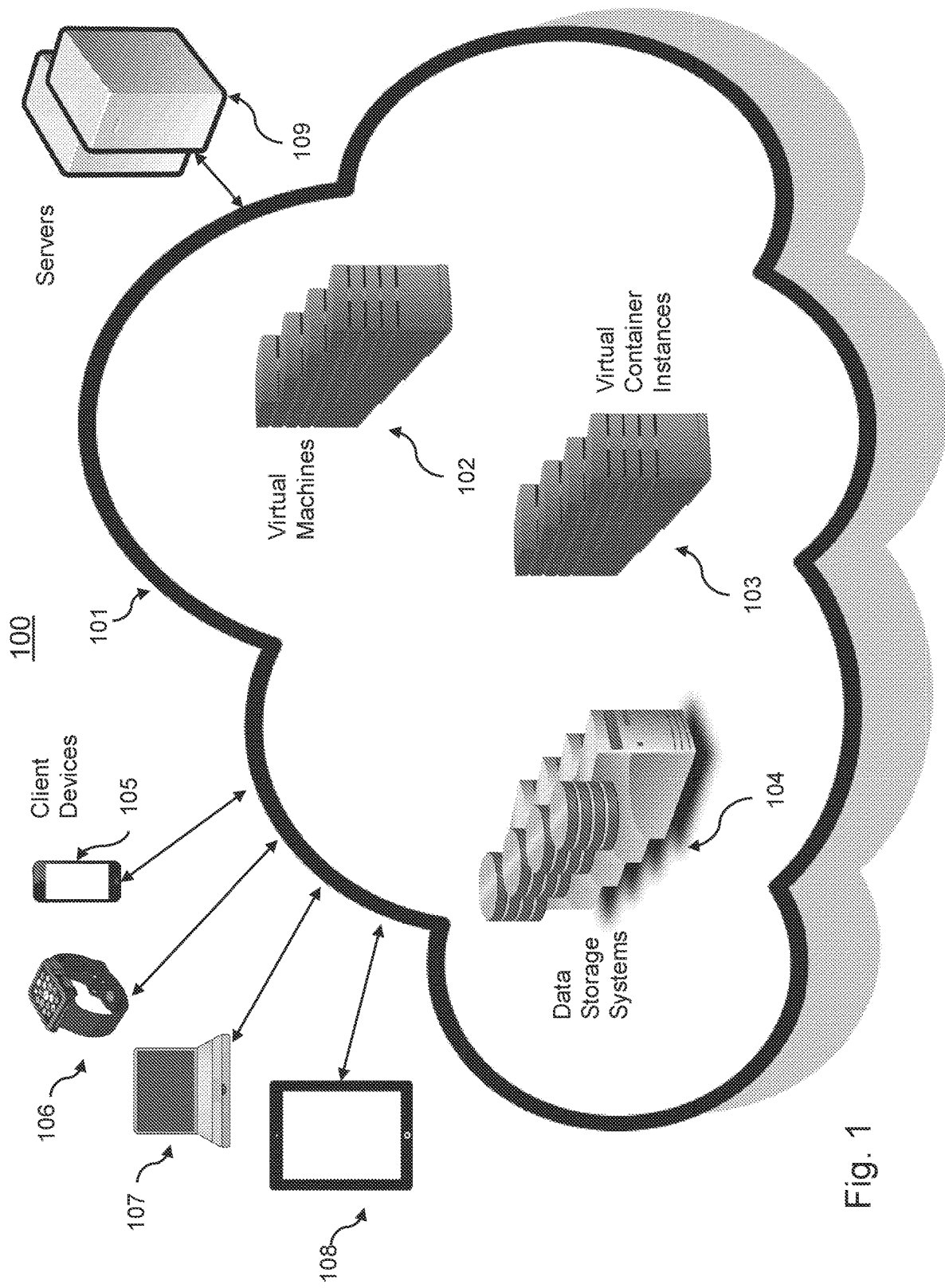
FIG. 1 is a block diagram of an exemplary system of virtualized execution instances and accessible client and server devices in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of identifying vulnerabilities for virtualized execution instances to escape their operating environment and threaten a host environment described herein overcome several technological problems relating to security, deployment, scalability, and efficiency in cloud-based virtual computing networks. In contrast to existing approaches, which focus on identifying malicious actions of active virtualized instances, the techniques disclosed herein can identify privileged virtualized instances before they are deployed and before they perform potentially insecure actions, such as exploiting a host system. As discussed further below, by analyzing virtualized instances and their configuration settings (e.g., flags, permissions, embedded credentials, etc.), it may be determined whether they have privileged capabilities that can provide access to a host system on which they are based. While existing approaches may identify improper access to a host system after it has occurred and damage has occurred, the disclosed techniques enable identification of privileged instances before they access a host system. Thus, rather than force organizations and cloud providers to react to cloud-based security breaches, the present techniques allow for preventative measures. When privileged virtual instances are identified, various types of control actions may be taken to neutralize their privileged characteristics, block their actions, monitor them, generate alerts for them, disable credentials associated with them, or require authentication, among other actions.

Notably, the disclosed techniques are effective to protect against both malicious attempts to escape a virtualized environment and penetrate a host environment or access sensitive data, as well as accidental or merely unauthorized access to a host environment or sensitive data. For example, malicious attempts may involve users intentionally attempting to observe information regarding a virtual instance and its underlying host, in an effort to exploit or elevate the instance's privileges and obtain control at the host. Accidental or simply unauthorized risks may arise, for example, when developers spin-up new privileged containers purposefully (e.g., because of problems they are having with virtual processes requiring more capabilities than non-privileged instances offer) or unintentionally (e.g., by setting a privilege flag without intending to do so).

The techniques of dynamically analyzing and enrolling virtualized execution instances discussed below also provide several technological improvements over conventional virtual orchestration approaches. For example, the disclosed techniques are better able to prevent external clients from accessing a virtual instance host system or sensitive data. As discussed below, by utilizing a privilege level or score for newly spun up instances to determine whether the instances should be automatically enrolled, the disclosed techniques may provide that clients can access non-privileged instances but not access privileged instances. Further, the disclosed techniques are better able to provide efficiency and scale compared to conventional approaches. By utilizing a privilege level or score to make a determination of whether to automatically enroll a new instance, the disclosed techniques can more quickly and accurately provision access to instances in an automatic fashion. Additional technological improvements, both in terms of enrolling instances and in permitting secure access to them by client identities, are discussed below.

Reference will now be made in detail to the disclosed embodiments, examples of which are illustrated in the accompanying drawings.

FIG. 1 illustrates an exemplary system 100 for identifying vulnerabilities for virtualized execution instances to escape their operating environment and threaten a host environment, or to access sensitive data (e.g., in data storage systems 104, or separate databases). As illustrated, system 100 may include a cloud-based, or virtualized, network 101 that is accessible to client devices 105-108 and servers 109. In various embodiments, cloud-based network 101 may be based on various types of virtual network infrastructure, such as that provided by Amazon Web Services™ (AWS), Microsoft Azure™, IBM Cloud™, and other virtual network providers. Cloud-based network 101 may include one or more virtual machines 102, which may be based on virtualization tools provided by Amazon Web Services™ (AWS), Microsoft Azure™, IBM Cloud™, Google Cloud Platform™, Cisco Metapod™, Joyent™, vmWare™, or others. Similarly, virtualized network 101 may include one or more container instances 103, which may be based on the same types of virtualized deployment tools, Docker™ container tools, Kubernetes™, tools, or other similar containerization tools. Further, the virtual machines 102 and containers 103 may be, in some embodiments, next generation virtual instance types (e.g., Quarkus™, Ibmjava™, etc.). Cloud network 101 may also include one or more data storage systems 104. In some embodiments, virtual machines 102 and container instances 103 may access storage systems 105 to obtain data, provide data, obtain application code, provide application code, etc. Further, in some embodiments, data storage systems 105 may be part of the cloud infrastructure (e.g., part of the host system, or storage devices operating as a SaaS or IaaS platform for client devices 105-108, etc.).

In various embodiments, cloud-based network 101 may include only one type of virtualized instance (e.g., only virtual machines, only containers, etc.), while in other embodiments cloud-based network 101 includes combinations of different types of virtualized instances. Cloud-based network 101 may be a private cloud network, a public cloud network, or a hybrid private-public cloud network. Numerous types of functionality and use may be made of cloud-based network 101, such as data storage, data retrieval, application storage, application execution, computation, data backup, etc.

As illustrated, various types of client devices may be configured to access cloud-based network 101. Examples include smartphones 105, smart jewelry or clothing 106, personal computers 107, tablets 108, and others. Of course, numerous other types of client devices may access cloud-based network 101 as well (e.g., IoT sensors or devices, smart home appliances, network-connected vehicles, building security systems, home automation systems, transportation communication systems, etc.). Likewise, servers 109 may access virtualized network 101 as well. Servers 109 may be, for example, web servers, application servers, on-premises corporate servers, cloud-based servers, etc. In some embodiments, client devices 105-108 and server 109 may be part of the same cloud-based network as network 101, a different cloud-based network, or various private or on-premises networks.

Figure 2:
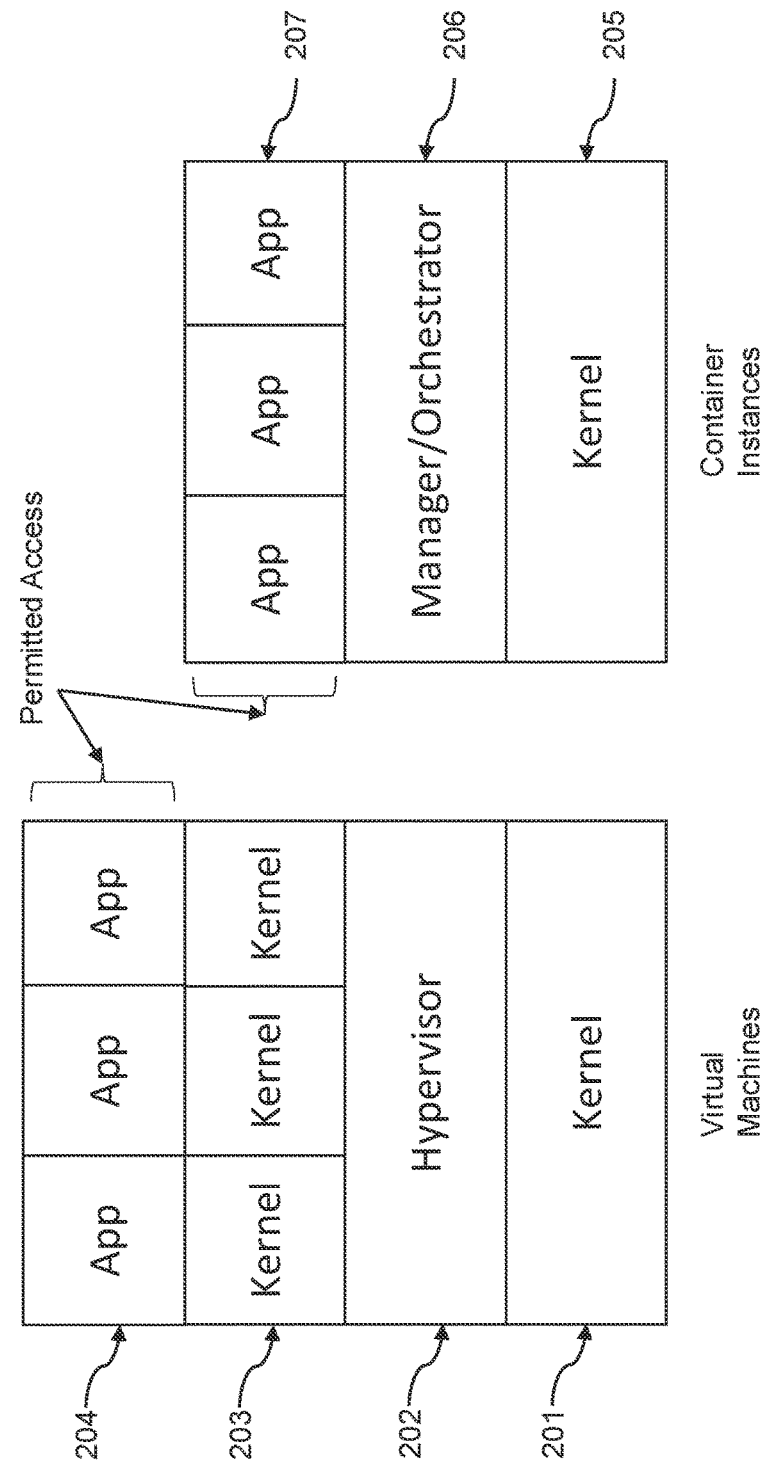
FIG. 2 is a block diagram showing an exemplary architecture of virtual machines and container instances in accordance with disclosed embodiments.

FIG. 2 is a block diagram showing an exemplary architecture 200 of virtual machines and container instances. As illustrated in FIG. 2, a virtual machine may be built or deployed based on a kernel 201, which may support a hypervisor or virtual machine manager 202. In a virtual machine framework, multiple operating system kernels 203 may be spun up to create multiple different virtual machine instances. The operating system kernels 203 may be based on whatever type of computing instance is being virtualized, such as a Microsoft Windows™ based operating system, a Linux operating system, a Unix operating system, or various other types of operating systems. Based on each kernel 203, virtualized applications 204 may be instantiated and executed as well. Users or other applications that interact with virtual machines may then interact with applications 204.

FIG. 2 also illustrates an arrangement of a virtual container instance (e.g., Docker™ container, etc.). Container instances may share a common underlying operating system kernel 205, and may be deployed and managed through a single (or multiple) manger or orchestrator tools 206. Each container instance may run one or more virtualized application 207, with which users or other applications may interact.

As discussed further below, when users or processes or applications interact with virtual machines or container instances, there is a permitted scope of access, which includes the virtualized application 204/207 and the virtualized operating system environment in which it operates. By contrast, the user, process, or application should not be able to escape from this permitted virtualized and isolated environment and penetrate the underlying host resources (e.g., hypervisor 202, manager/orchestrator 206, or kernel 201/205) or other virtual instances running on the host. As discussed further below, a virtualized instance with the capability to escape its permitted virtualized environment and perform operations (e.g., access, read, write, modify, etc.) at the host level is considered a privileged virtual instance. Similarly, a virtual instance may be deemed privileged if it has access to sensitive data (e.g., protected personal, medical, or financial data, etc.). Privileged virtual instances may have such strong or elevated access rights through various flags or parameters that can be set when the virtualized and isolated instance is initially spun up, during a pre-instantiation phase (e.g., a DevOps development phase where a developer is configuring code for the instance, privileges of the instance, credentials of the instance, or other features, but has not yet released the instance into a live and operational environment), or after spin-up (e.g., through modification by another privileged virtual instance, or by an administrator, etc.).

As shown below in Table 1, various characteristics may differentiate privileged virtual instances from default, or non-privileged virtual instances. Of course, these characteristics are configurable and flexible, so that different classifications of privileged versus non-privileged virtual instances are possible.

TABLE 1

| Attribute or Parameter | Privileged Virtual Instance | Default Virtual Instance |
| --- | --- | --- |
| Capabilities | ALL | Only certain ones (see Table 2, below) |
| Devices | ALL | Only minimum required devices are allowed access (see Table 3, below) |
| Kernel File System | Read/Write | Read Only |
| Seccomp | Unconfined | Default profile |
| AppArmor | Unconfined | Default profile |
| Namespace Separation to Host | ON | ON |
| User Running Container | Root | Root |
| Certain/Proc Foes | Has access | Access Not Allowed |

In some embodiments, when a virtual instance is spun up, or modified by an administrator after spin-up, a privileged flag may be set for the virtual instance. For example, a privileged flag for a container instance may give the container instance all (or nearly all) capabilities, and lift all limitations that may otherwise be enforced (e.g., by a device cgroup controller). When such a privileged flag is set for the container, the container may have all (or nearly all) of the capabilities and rights that the underlying host has. The privileged flag may be set for certain intentional reasons (e.g., for the use case of running a Docker™ within Docker™), may be set through an oversight or mistake during development or spin-up of the instance, or may be set maliciously (e.g., when an attacker gains access to the virtualization or DevOps platform itself and spins up privileged container instances).

According to Table 1, above, although both containers are run by the root user, there are significant differences between a privileged virtual instance and a default (non-privileged) virtual instance. The privileged virtual instance in Table 1 is running with root privileges with all capabilities allowed. That may include CAP_SYS_ADMIN, for example, which conveys a major part of Linux root powers. Starting from kernel 2.2, Linux divides the privileges associated with a superuser into distinct units, known as capabilities, which can be independently enabled or disabled. In addition to these powers, privileged virtual instances may have access to all devices (e.g., devices operating on the host virtual platform). With the CAP_SYS_ADMIN capability, this may allow users to mount any device, and provides an attack vector to host access via mounting the host's hard drive. Other vulnerable devices are text terminal or TeleTYpe-writer (TTY) devices, USB sticks, raw network data, CD ROMs, etc. For example, TTY devices are vulnerable since they may be used to inject characters into other users' TTYs, including the host's login TTYs.

By having access to the kernel file system, the host kernel (e.g., Linux kernel) may be re-configured by an attacker. For example, the attacker may accomplish this by writing certain data to the kernel file, such as: /sys/fs/cgroup/devices/devices.allow.

A root user may be able to create, read, and write to new devices, which was not previously allowed in the default virtual instance environment itself. Further, a privileged virtual instance's root user may have access to a number of files that the default virtual instance's root user does not have. These files may provide attackers a head start in their attack and expand the attack surface. One such file is: /proc/kallsyms, which contains kernel variable names and their memory addresses.

Various types of flags or parameters may provide virtual instances elevated or privileged access rights to a host system. For example, the "device flag" adds a device to the virtualized environment. As an illustration: docker run --device=/dev/sda1:/dev/sda1 would add the sda1 hard disk, usually the host's disk, to the /dev directory of the new virtual instance. With respect to containers, for example, Docker™ may add this device with read/write capabilities, which allow the user inside the container to either mount the added device, or use other tools, such as dd or debugfs to further probe into the host's data. All of these tools may allow unabridged read and write access to the host's device.

As another type of flag, the "cap-add" flag adds capabilities, which may not be allowed by default, which allow the operator precise control over the capabilities set of the virtual instance. This flag may also pose security risks, such as: CAP_SYS_ADMIN, which allows the performance of a range of system administration operations (e.g., mounting new devices, sending data to other users' TTYs, etc.). Further, CAP_SYS_MODULE allows the virtual instance to load and unload kernel modules, CAP_SYS_RAWIO allows I/O port operations, CAP_SYS_TIME sets the system clock and hardware real-time clock, CAP_DAC_READ_SEARCH supports certain file read/write operations which can access host data directly, SYS_PTRACE allows the virtual instance to trace arbitrary processes using ptrace (e.g., to extract credentials from running processes on the same container), and SYS_BOOT uses reboot and kexec_load to reboot and load a new kernel for later execution. SYS_BOOT allows an attacker inside the virtual instance to eventually replace the kernel with their own kernel.

A further type of flag is the "device-cgroup-rule" flag, which is a more implicit flag of Docker™ containers that instructs the kernel (e.g., Linux kernel) to allow creation of new devices in the container. Although it may seem that no new devices are present in the container, with the "device-cgroup-rule" flag a user may still be able, covertly, to create such a device, exploit its content, and then dispose of it, leaving no visible marks inside the container. An example of using this flag is: docker run -it --device-cgroup-rule "b 8:1 rwm". This example sets up a seemingly default virtual instance but with the ability to create, read, and write from a block device (b) type 8:1. The block 8:1 device may be the main hard disk of certain Linux systems, which practically allows the virtual instance to access all the data on the host's hard drive for read or write actions.

As a further example, the "v flag" may allow an attacker to gain privileged access to the host's system using the Docker™ volume mount method. This method supports mounting all or a part of the host's file-system, including /proc and /dev for example, into the virtual instance. This also includes mounting the Docker™ socket itself, which is the Unix socket that the Docker™ daemon listens on by default, and can be used to communicate with the daemon from within a virtual instance, which generally means that the virtual instance has total control over the host.

A further particularly potent flag is the "pid flag." For example, an operator can instruct Docker™ to setup a virtual instance running in the same PID namespace of the host. The following line: docker run --it --privileged --pid=host ubuntu sets up a virtual instance, which not only is using the "privileged flag," but also uses the same PID namespace as the host. This means that the virtual instance practically has access to all processes running on the host as root, and can use: nsenter -p {pid}-a to insert the PID number of any of the host's processes in this command, and the virtual instance switches to the host's namespaces. This gives the virtual instance the same privileges as any other root process running on the host, and practically removes all the security walls and isolation between the virtual instance and the host.

Other types of privileged virtual instances include containers that include the "ipc=host" and "net=host" flags. These flags instruct, for example, Docker™ to share IPC (Interprocess Communications) or Network namespaces with the host.

With reference to the capabilities that may differentiate default from privileged virtual instances, as noted in Table 1, Table 2 below provides more detail on such capabilities, which may be considered capabilities associated with a default or non-privileged instance.

TABLE 2

| Capability Type | Capability Description |
|---|---|
| SETPCAP | Modify process capabilities |
| MKNOD | Create special files using mknod(2) |
| AUDIT_WRITE | Write records to kernel auditing log |
| CHOWN | Make arbitrary changes to file UIDs and GIDs |
| NET_RAW | Use RAW and PACKET sockets |
| DAC_OVERRIDE | Bypass file read, write, and execute permission checks |
| FOWNER | Bypass permission checks on operations that normally require the file system UID of the process to match the UID of the file |
| FSETID | Don't clear set-user-ID and set-group-ID permission bits when a file is modified |
| KILL | Bypass permission checks for sending signals |
| SETGID | Make arbitrary manipulations of process GIDs and supplementary GID list |
| SETUID | Make arbitrary manipulations of process UIDs |
| NET_BIND_SERVICE | Bind a socket to internet domain privileged ports (e.g., port numbers less than 1024) |
| SYS_CHROOT | Use chroot(2), change root directory |
| SETFCAP | Set file capabilities |

With regard to the device types noted above in connection with FIG. 1, Table 3 includes more detail on the types of devices that may be considered to differentiate privileged from non-privileged virtual instances, which as shown below may be associated with a default or non-privileged instance.

TABLE 3

| Device Name | Major:Minor | Description |
|---|---|---|
| Console | C 136:0 | First Unix98 pseudo-TTY |
| Full | C 1:7 | Returns ENOSPC on write |
| Random | C 1:8 | Nondeterministic random number generator |
| TTY | C 5:0 | Current TTY device |
| Urandom | C 1:9 | Faster; less secure random number generator |
| Zero | C 1:5 | Null byte source |
| Null | C 1:3 | Null device |
| Console | C 5:1 | System console |
| Ptmx | C 5:2 | PTY master multiplex (TTY) |

Figure 3:
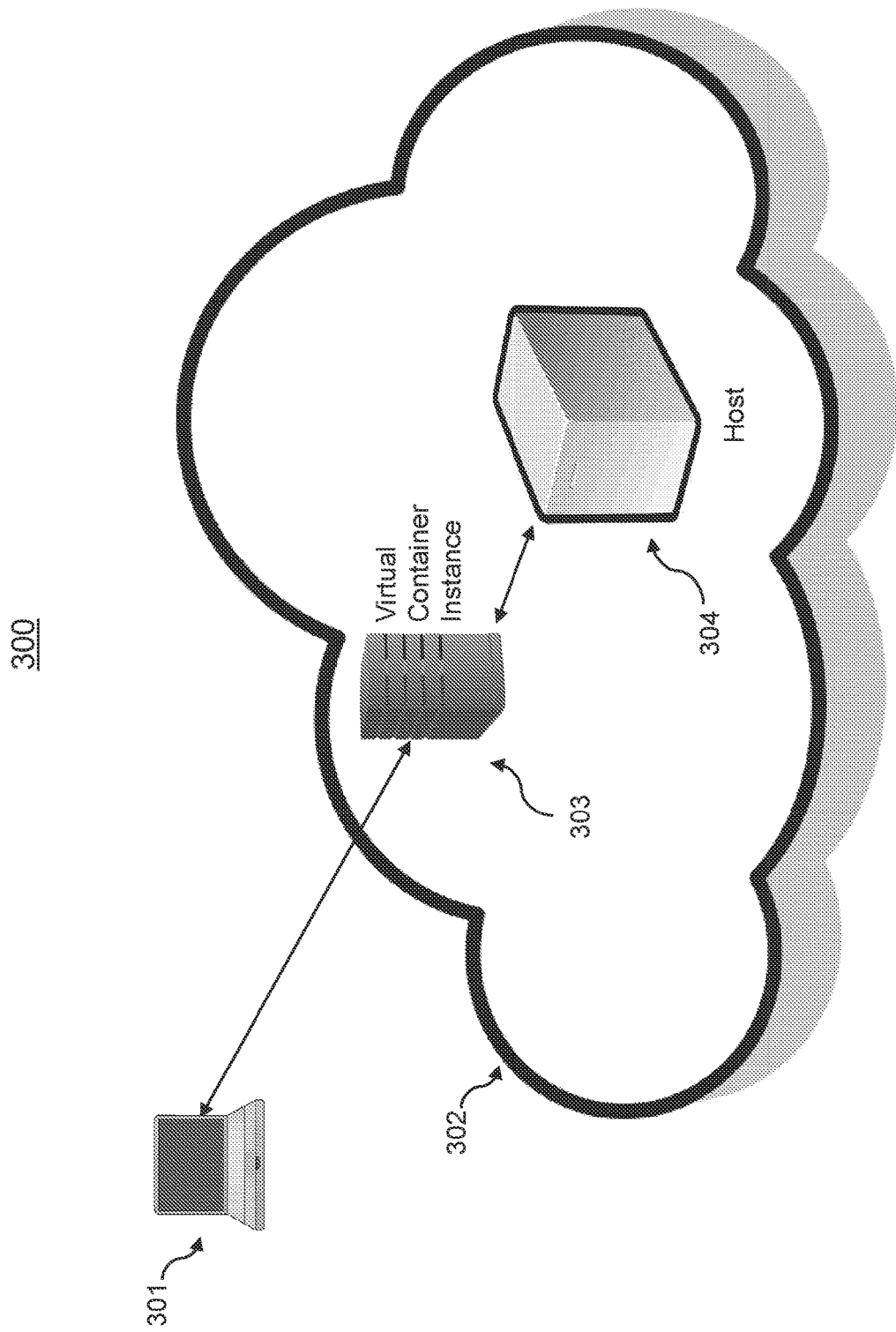
FIG. 3 is a block diagram depicting an exemplary external resource attempting to access a virtual container instance in accordance with disclosed embodiments.

FIG. 3 is a block diagram of a system 300 where an exemplary external resource 301 is attempting to access a virtual container instance 303. Of course, consistent with the above discussion, virtual container instance 303 may be a container, a virtual machine, or other type of virtualized and isolated computing instance. As illustrated, virtual container instance 303 may be spun up in a cloud-based network 302 by a host 304.

Consistent with the above discussion, if the virtual container instance 303 is a default, non-privileged instance, the user or application 301 may be limited to operating within the permitted virtual environment of the virtual container instance 303 itself. On the other hand, if the virtual container instance 303 is a privileged virtual instance (e.g., because one or more of the types of flags discussed above is set, because the virtual container instance 303 has embedded privileges or credentials, etc.), the user or application 301 may attempt to probe the host system 304 itself and potentially gain access to the host system 304, access to other virtual instances supported by the host system 304, or even access to other host instances supported by the host system 304. As discussed above, if the user or application 301 is successful in escaping from the virtualized and isolated environment of the virtual container instance 303 and penetrates the host system 304, the user or application 301 may have expansive privileges to read, write, and modify data and applications running on the host 304 as well as other virtual instances being supported by the host 304. In such a scenario, the threat surface increases vastly when the user or application 301 is able to penetrate the host system 304. Additionally, if the user or application 301 is able to utilize the virtual container instance 303 to access sensitive data (e.g., in a sensitive database), that capability may also indicate that the virtual container instance 303 is privileged.

Figure 4:
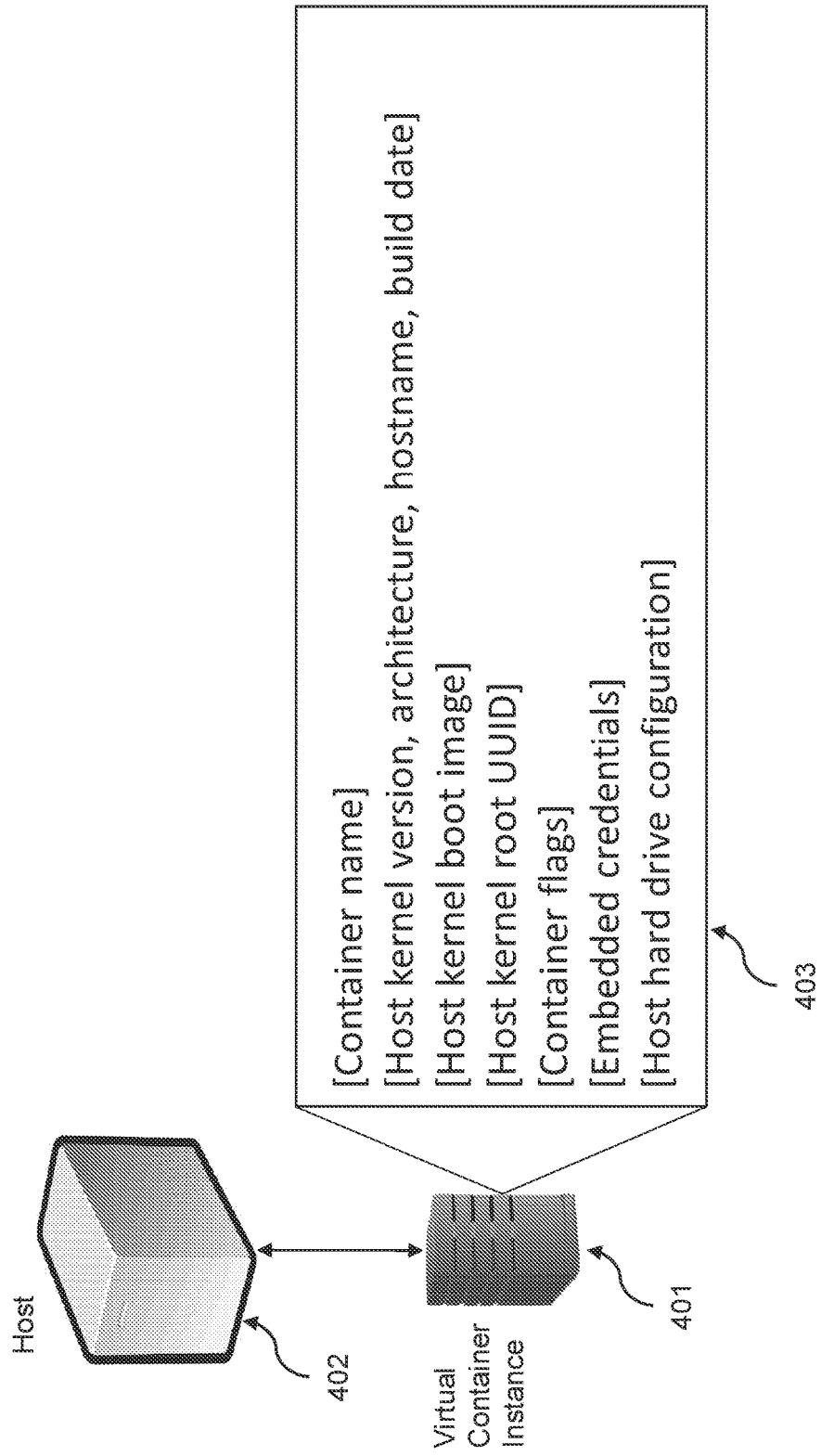
FIG. 4 is a block diagram depicting an exemplary process of a virtual container instance being used to obtain host system information in accordance with disclosed embodiments.

FIG. 4 is a block diagram 400 depicting an exemplary technique of a virtual container instance 401 being used to obtain information regarding the virtual instance 401 and the host system 402. As described herein, when a user or application has access to a virtual instance 401, it may probe the virtual instance 401 or cloud orchestration tools to determine information about the virtual instance 401 as well as the host 402 supporting the virtual instance 401. In some embodiments, detectable information 403 regarding the virtual instance 401 and host 402 may be obtained from a DevOps, continuous development, or continuous deployment process (e.g., Chef™, Puppet™, Jenkins™, Git™, etc.). For example, virtual instances being developed using such tools may be monitored as they are being created, or reports from the tools may be provided as they are being created. In some situations, the probing for information may also be performed using Docker™ or various command-line interface or command language interpreter (CLI) tools (e.g., runc, docker-runc, etc.) In further embodiments, detectable information 403 regarding the virtual instance 401 and host 402 may be gathered or reported from virtualization orchestration tools, such as AWS CloudFormation™, Kubernetes™, Puppet™, Ansible®, Google Cloud Deployment Manager™, Microsoft Azure Formation™, or others. For example, when virtual instances are configured, deployed, requested to be deployed, or updated, such virtualization tools may provide reports regarding detectable information 403. In further embodiments, detectable information 403 may be gathered by inserting a security layer into a virtualization environment running on top of a virtualization platform (e.g., AWS™, Azure™, IBM Cloud™, etc.). Such custom security layer may detect the creation, deployment, request for deployment, modification, and actions of virtual instances, and gather detectable information 403 based on such events.

Examples of information that may be detected are shown in element 403, and may include the virtual instance's name, the host kernel version, host system architecture, host system namespace, host build date, host kernel boot image, kernel root unique ID (e.g., UUID), various types of virtual instance flags (e.g., as discussed above), embedded credentials, host hard drive or other hardware configuration settings, and various other types of information. Consistent with the above discussion, detectable information 403 may also include the specific information from Tables 1-3.

In different embodiments, the detectable information 403 may be detected and acted upon in several ways, either before, concurrently with, or after spin-up of the virtual instance 401. For example, in a DevOps, continuous development, or continuous deployment environment, new virtual instances may be configured before they are deployed. Developers may, for example, specify what code or applications certain instances should run, what operating systems they should use, what connections parameters they should have vis-à-vis other virtual instances or other network resources, and what security attributes (e.g., flags, privileges, credentials, etc.) they should have. In such environments, before virtual instances are spun up or sent into production, the detectable information 403 may be gathered for each such virtual instance. Likewise, when virtual instances are being configured using a cloud-based platform tool (e.g., AWS™, Azure™, IBM Cloud™, etc.), detectable information 403 may be gathered before instances are spun up. In some embodiments, detectable information 403 is gathered on a continuous basis (e.g., periodically, constantly, etc.). In further embodiments, detectable information 403 is gathered on an event-basis (e.g., upon detecting the configuration of a new virtual instance, a request to spin up or deploy a virtual instance, a request to modify a virtual instance, a requested communication or action by a virtual instance, etc.). In additional embodiments, some of detectable information 403 may be acquired by running a filesystem debugger (e.g., debugfs in Linux environments, xfs_db in XFS environments, etc.). For example, using a debugger, information may be gathered regarding the filesystem structure, hierarchy, and content of the host's filesystem. Once the host's filesystem has been reached, additional commands may be entered to obtain lower levels of information regarding the host (e.g., root level host information, such as the root directory structure, hierarchy, and contents).

In other embodiments, detectable information 403 is acquired after virtual assets are already spun up. For example, such information may be gathered using similar techniques to those discussed above (e.g., continuously and automatically gathering detectable information 403, or gathering such information on an event-basis or trigger-basis).

According to further embodiments, predictive controls may be implemented for detectable information 403 to determine what configurations or parameters are likely to cause privilege risks for virtualized instances. For example, consistent with the above discussion, when certain flags are identified to be set for a virtual instance (e.g., a privilege flag, a PID flag, etc.), those flags may be assigned weights or scores in terms of their likelihood of creating privilege risks. Similarly, the presence or absence of embedded credentials or other secrets in virtual instances may receive weights or scores. Based on such weights or scores, the particular attributes of a given virtualized instance may be analyzed and judged in terms of the particular privilege risk for that virtualized instance. In some embodiments, the scores or probabilities of privilege risk for specific virtual instances are compared to threshold values, which may be used to determine whether to implement a control action for the instances, and if so, what control action to implement. In further embodiments, configuration profiles or categories are created, which may have preset or known scores or probabilities of privilege risk. When detectable information 403 is gathered for virtual instances, such information may be modeled to the closest matching configuration profile or category (e.g., using statistical tools such as "best fit" modeling). When a virtual instance is matched with a particular configuration profile or category, the score or probability of privilege risk for that profile or category may be used to determine whether to perform a control action for the virtual instance, and if so, what control action to perform. In further embodiments, such configuration profiles and categories may be adjustable either manually by administrators, or automatically based on machine learning in the cloud-based network.

The privilege scores or probabilities that are determined for virtual instances may be used in making decisions about which virtual instances to automatically enroll at a security server. As discussed further below in connection with FIGS. 8A-8G, 9A-9C, 10, and 11, if a privilege score or level is below a threshold, the instance may automatically be enrolled at the server. This may involve, for example, registering the port number of the instance and provisioning a cryptographic key (e.g., certificate authority public key) to the instance. Consistent with below embodiments, the instance may then use the cryptographic key to validate incoming requests for connections from clients or other identities.

Figure 5:
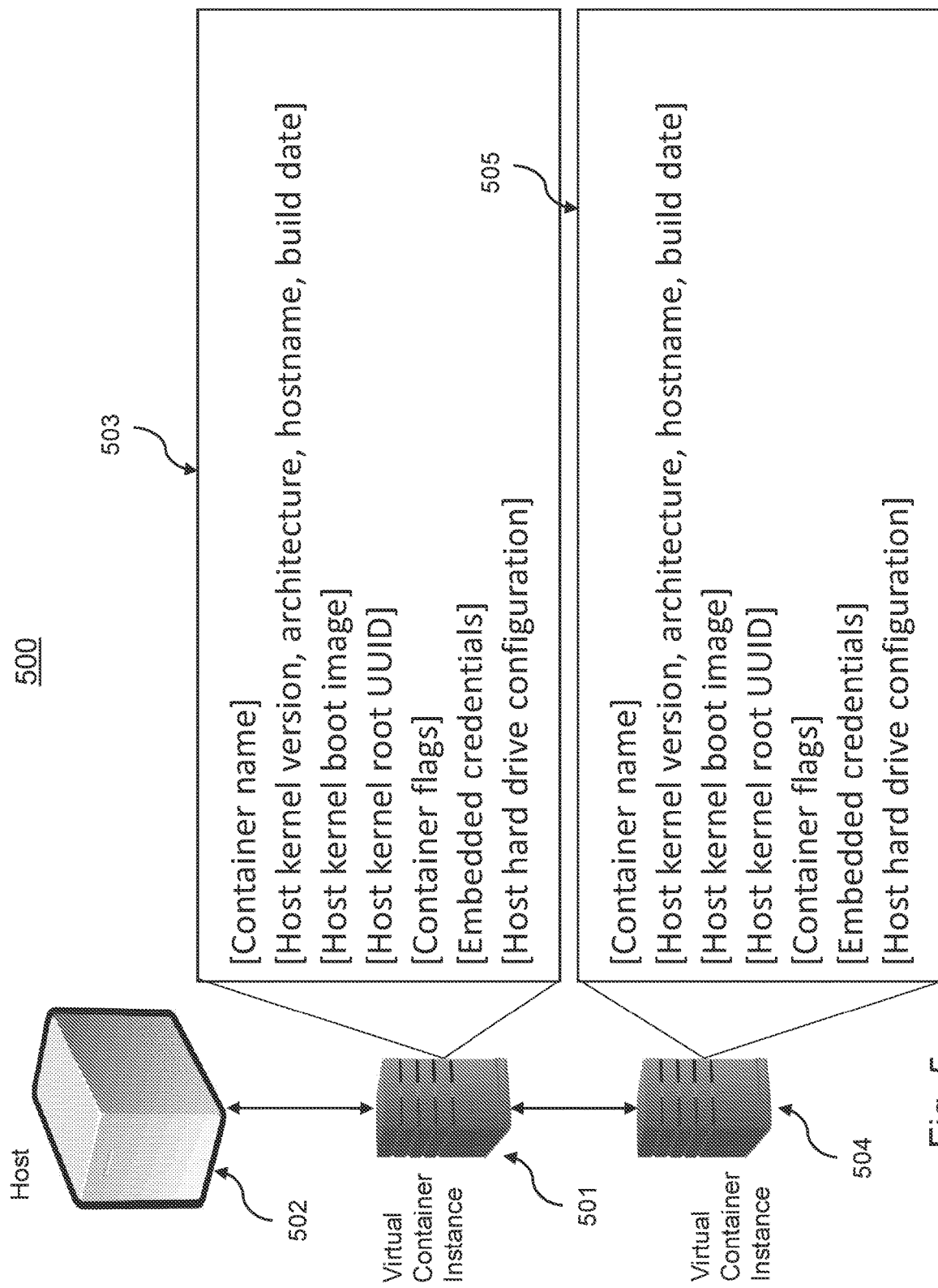
FIG. 5 is a block diagram depicting an exemplary process of a virtual container instance obtaining access to another virtual container instance, in order to obtain host system information in accordance with disclosed embodiments.

FIG. 5 illustrates a variation on the system of FIG. 4, where rather than there being one virtual instance 501 being examined there are multiple virtual instances 501/504 being examined. In system 500, for example, virtual instance 501 may have privileges, permissions, or credentials giving it access to virtual container instance 504. In some situations, even if virtual container 501 is not itself privileged (e.g., has no privilege flags or credentials, or does not match a privilege profile), virtual instance 504 may be privileged. In this situation, because virtual instance 501 has access to virtual instance 504, a user of virtual instance 501 may be able to operate on or exploit virtual instance 504 to obtain access to the host system 502 underlying virtual instances 501 and/or 504. For example, the user may probe the detectable information 503 available from virtual instance 501, discover that the detectable information references virtual instance 504 (e.g., by name, by identifier, by network address, etc.), and may then access virtual instance 504 and probe detectable information 505 regarding virtual instance 504 and host 502.

As discussed above, once a user is able to penetrate the host system 502 using any privileged virtual instance, the user may inflict widespread damage throughout the host system 502 and throughout the virtual instances running on the host 502. Accordingly, system 500 illustrates an indirect approach to privilege escalation and host penetration prevention, where the dangers of such attacks may be equally severe as the direct types of attacks discussed above.

Figure 6:
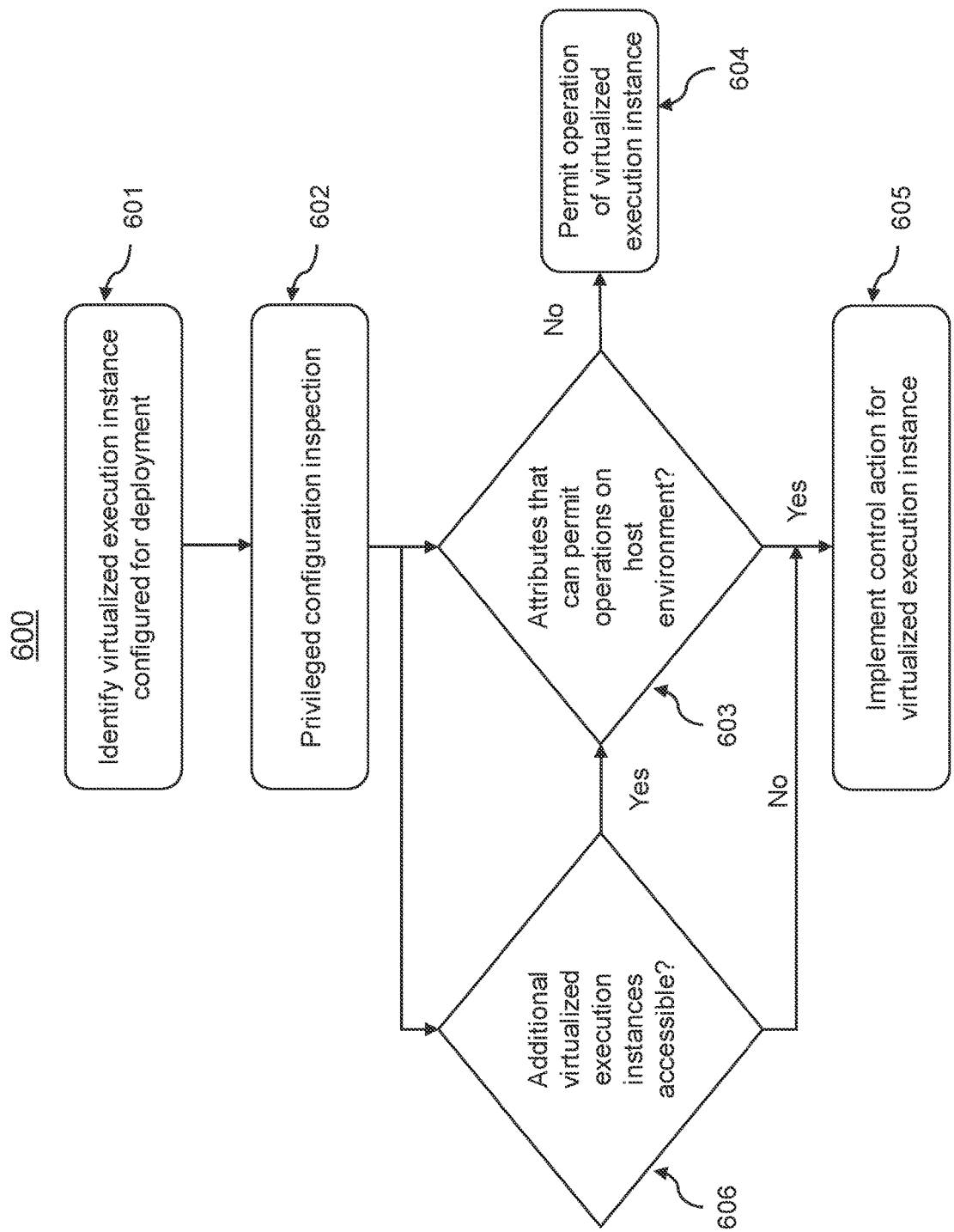
FIG. 6 is a flowchart depicting an exemplary process for identifying vulnerabilities for virtualized execution instances to escape their operating environment and threaten a host environment accordance with disclosed embodiments.

FIG. 6 is a flowchart depicting an exemplary process for identifying vulnerabilities for virtualized and isolated execution instances to escape their operating environment and threaten a host environment. Process 600 may be performed, for example, in the system environments of FIGS. 1, 3, 4, and 5, with virtual instances such as those described in connection with FIG. 2. Notably, process 600 may be performed before, concurrently with, or after virtual instances are deployed or spun up in a virtualized environment.

Process 600 may include an operation 601 of identifying a virtualized and isolated execution instance configured for deployment on a host in a virtual computing environment. As discussed above, there are several ways in which such a virtualized instance (e.g., virtual machine, container, next-generation container, etc.) may be identified. For example, during a DevOps, continuous development, or continuous deployment process, a new virtual instance being configured or deployed may be identified. The new instance may be identified by intercepting a call to create a new virtual instance (e.g., at the docker-runc layer), through a scan of the virtual instance's image, through a scan of a development environment using tools such as Chef™, Puppet™, Jenkins™, Git™, etc., or from a report from such tools regarding the configuration, deployment, or request to deploy the new virtual instance. In some implementations, the scanning operations may be performed once the call to create the instance is intercepted. As another example, in a cloud-based environment, tools such as AWS CloudFormation™, Kubernetes™, Puppet™, Ansible™, Google Cloud Deployment Manager™, Microsoft Azure Formation™, or others may be used to scan the cloud environment or to identify requests to configure, deploy, or modify virtual instances. As a further example, operation 601 may be performed after virtual instances have been spun up. For example, virtual instances may be identified while deployed based on their attempts to communicate, attempts to perform actions on other virtual instances or on a host system, attempts to change their configuration settings, or attempts made from outside to modify the instances. Such runtime activities are further addressed in connection with FIG. 7.

Process 600 may also include an operation 602 of performing a privileged configuration inspection for the virtualized execution instance. Consistent with the above discussion, operation 602 may be performed before an instance is spun up or deployed (e.g., during a development phase), concurrently with deployment (e.g., triggered based on a request to deploy), or following deployment (e.g., based on an activity trigger). Various types of specific events may be used as triggers to perform the privileged configuration inspection of operation 602. For example, the inspection may occur based on an attempt to create a new virtual instance, duplicate an existing virtual instance, configure or reconfigure a virtual instance, change permissions of a virtual instance, change dependencies between two or more virtual instances, apply a security profile or setting to a virtual instance, embed credentials into a virtual instance, change code or functionality of a virtual instance, deploy a virtual instance, or request deployment of a virtual instance, among various others. Through these various types of triggers for performing the privileged configuration inspection, even relatively rare but sensitive risks may be detected (e.g., when a new privileged process is created within a non-privileged container instance, such as through use of the "docker exec --it --privileged" Docker™ command, a privileged configuration inspection may consequently be performed and the privilege risk may be detected. Alternatively, the inspection may occur continuously or periodically.

The privileged configuration inspection may include analyzing whether the virtualized and isolated execution instance has been configured with one or more attributes that can permit operation of the virtualized execution instance to perform operations, beyond an environment of the virtualized execution instance, on an environment of the host. For example, as discussed above in connection with FIGS. 4-5, various types of information regarding the virtual instance may be obtained through an analysis of the configuration settings of the virtual instance, through use of a filesystem debugger (e.g., debugfs, xfs_db, etc.), through a report from a development (e.g., DevOps) platform tool, through a report from a virtual network application (e.g., AWS CloudFormation™, Kubernetes™, etc.), or through other techniques. Consistent with the discussion above, the privileged configuration inspection may involve a binary decision (e.g., whether or not a particular privilege flag is set) or may involve identifying a level of privileged capabilities on a continuum based on one or more parameters for the virtual instance (e.g., based on the scores and probabilities discussed above).

As discussed above, the privilege inspection may involve analyzing in operation 603 whether particular privilege flags are set for a virtual instance, whether particular permissions are given to the virtual instance, whether embedded secrets or other credentials are included in or accessible to the virtual instance, etc. Further, in some embodiments, scores or probabilities of privilege risk may be given to virtual instances. As discussed above, particular configuration parameters (e.g., flags, permissions, credentials, etc.) may be given scores and/or weights, which are used to compute an overall score or probability score for the virtual instances. The score or probability of privilege risk may then be compared to a threshold to determine whether to perform a control action for the virtual instance, and if so, what control action to take, as discussed further below. The score or probability may also be used to determine whether to automatically enroll the virtual instance at a security server, as discussed in connection with FIGS. 8A-8G, 9A-9C, 10, and 11. In additional embodiments, profiles or categories of privileged virtual instances may be developed. For example, the profiles or categories may be developed by administrators, third parties specializing in virtual instance security, or through a machine-learning process based on observing the creation and activity of virtual instances over time. When a virtual instance is then identified (in operation 601), the virtual instance may be compared (e.g., statistically modeled) to a profile or category for privileged instances. If a match (or near-match) is found, the identified virtual instance may be treated as part of the profile or category. Consequently, if a security policy specifies a particular control action for the profile or category, as discussed further below, that control action may be applied to the virtual instance.

If in operation 603 a virtual instance is deemed to be a privileged identity (e.g., through the analysis above), process 600 may proceed to operation 605 and a control action may be taken for the instance. On the other hand, if the profile or category is associated with a default or non-privileged instance, process 600 may proceed to operation 604 and a control action may be unnecessary. For example, operation 604 may include taking no action and letting the virtual instance be spun up, deployed, modified, or operated. Additionally, operation 604 may include automatically enrolling the virtual instance at a security server, as discussed below in connection with FIGS. 8A-8G, 9A-9C, 10, and 11.

Process 600 may further include an operation 606 of determining whether the virtual instance being investigated is able to access additional virtual instances. For example, consistent with the discussion above regarding FIG. 5, one virtual instance may be non-privileged when considered in isolation, but when considered in terms of its overall environment it may have access to a privileged virtual instance. In that event, both virtual instances may be considered privileged based on an analysis of their detectable information, since the first virtual instance may be able to escalate its privileges or exploit the second virtual instance to penetrate the host environment. Accordingly, in process 600, if the virtual instance being analyzed is capable of accessing additional other virtual instances in operation 606, process 600 may continue with further iterations of operation 603 for those additional virtual instances. For each such virtual instance, based on the analysis in operation 603, process 600 may either find no privileged virtual instance and proceed to operation 604, or may find a privileged virtual instance and decide on a control action in operation 605.

Figure 7:
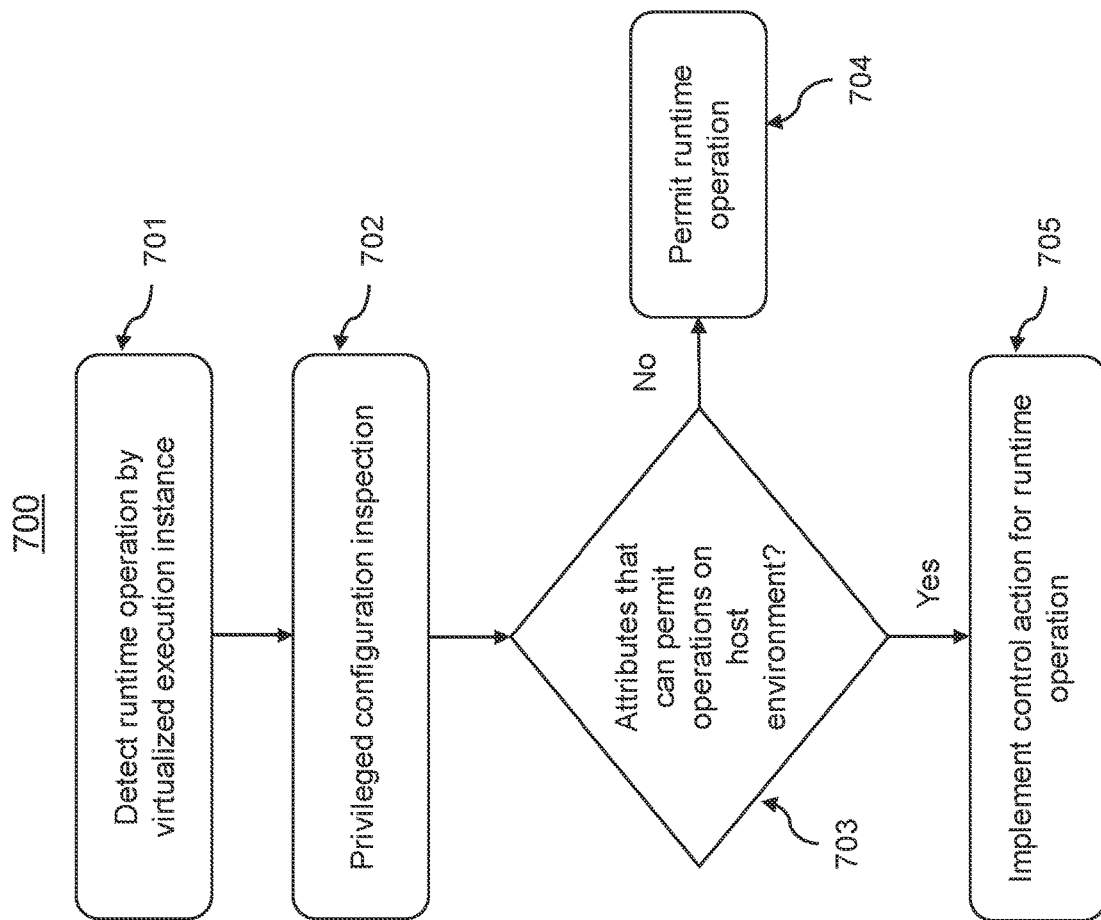
FIG. 7 is a flowchart depicting an exemplary process for identifying runtime activity that may allow virtualized execution instances to escape their operating environment and threaten a host environment in accordance with disclosed embodiments.

FIG. 7 is a flowchart depicting an exemplary process for identifying runtime activity that may allow virtualized execution instances to escape their operating environment and threaten a host environment. Like process 600, process 700 may be performed in the system environments of FIGS. 1, 3, 4, and 5, with virtual instances such as those described in connection with FIG. 2.

In an operation 701, process 700 may include detecting runtime operation activities by a virtual instance that is running in a cloud-based network. In some embodiments, for example, certain predetermined actions may be deemed sensitive to security and may lead to a privileged configuration inspection in operation 702. Examples may include changing the virtual instance parameters (e.g., flag settings, permissions, embedded credentials, etc.), changing the dependencies or access rights among two or more virtual instances, applying or modifying a security policy to the virtual instance, attempting to access a host system filesystem, attempting to write or modify data or applications running on the host system, etc.

When such sensitive actions are detected during runtime of a virtual instance in operation 701, process 700 may proceed to operation 702 of performing a privileged configuration inspection for the virtual instance. Operation 702 may be substantially similar to operation 602, as discussed above, including analyzing in operation 703 whether the virtual instance is capable of operating on the underlying host environment. If the virtual instance is determined to be capable of operating on the host environment (e.g., penetrating the filesystem of the host, or even the root directory of the host), process 700 may proceed to operation 705 and implement a control action for the runtime activity of the virtual instance. Alternatively, if no privileged risk is found for the runtime activity or the virtual instance, process 700 may proceed to operation 704 and permit the runtime activity to continue.

In operation 605 of process 600, and operation 705 of process 700, various types of control actions are possible. In some embodiments, a security policy may determine whether to perform a control action, and if so, what control action to apply. Examples of control actions include permitting or blocking a virtual instance to proceed from development into deployment, to be spun up, to be enrolled at a security server, to be configured or reconfigured, to have new or different dependencies with other virtual instances, to operate in a cloud environment, generating an alert based on the virtual instance, generating a report based on the virtual instance, requiring second-tier (e.g., administrator) approval or additional (e.g., two-factor) authentication, etc.

Consistent with the above discussion, the security policy may dictate certain situations in which a virtual instance is automatically classified as privileged and a control action is taken. As an illustration, if the "privileged" or "PID flag" is set for the virtual instance, the instance may be deemed privileged and a control action may be taken (e.g., requiring second-tier approval or authentication, generating an alert, etc.). Alternatively, as discussed above, scores or probabilities may be assigned to virtual instances based on the individual parameters associated with them (e.g., based on flag settings, permissions, embedded credentials, etc., each of which may have a corresponding weight). For scores or probabilities above a particular threshold, virtual instances may be considered privileged and an appropriate control action may be taken.

In some embodiments, multiple thresholds may be used. For example, a score or probability below a first threshold may indicate that a virtual instance is non-privileged and may operate or be deployed without restriction or automatically enrolled, a score or probability between a first and second threshold may mean that an alert should be generated, and a score or probability above the second threshold may mean that the virtual instance is blocked from deployment or authentication should be required prior to deployment. Further, in embodiments where virtual instances are modeled to predefined profiles or categories of virtual instances, the privileged status of the virtual instance may be based on such modeling. For example, various profiles or models may be created to correspond to specific privileged risk attributes. Some profiles or categories may be associated with non-privileged instances, others may be associated with highly or completely privileged instances, and still others may fall in the middle with some level of privileged risk below complete or full risk. According to the security policy, when a virtual instance is modeled or matched to a particular profile or category, the profile or category may have a corresponding control action that is applied. Using such profiles or categories, techniques may be applied for predictive privilege classification. For example, as a virtual instance is being developed or configured (e.g., in a DevOps environment), the privileged inspection discussed above may be run. As different parameters for the virtual instance are set, the virtual instance may be continuously modeled or matched to the profiles or categories. Accordingly, real-time privilege inspection may be performed for the virtual instance throughout the development and production cycles. Consistent with the above discussion, real-time control actions may correspondingly be applied during development and production as well.

Figure 8A:
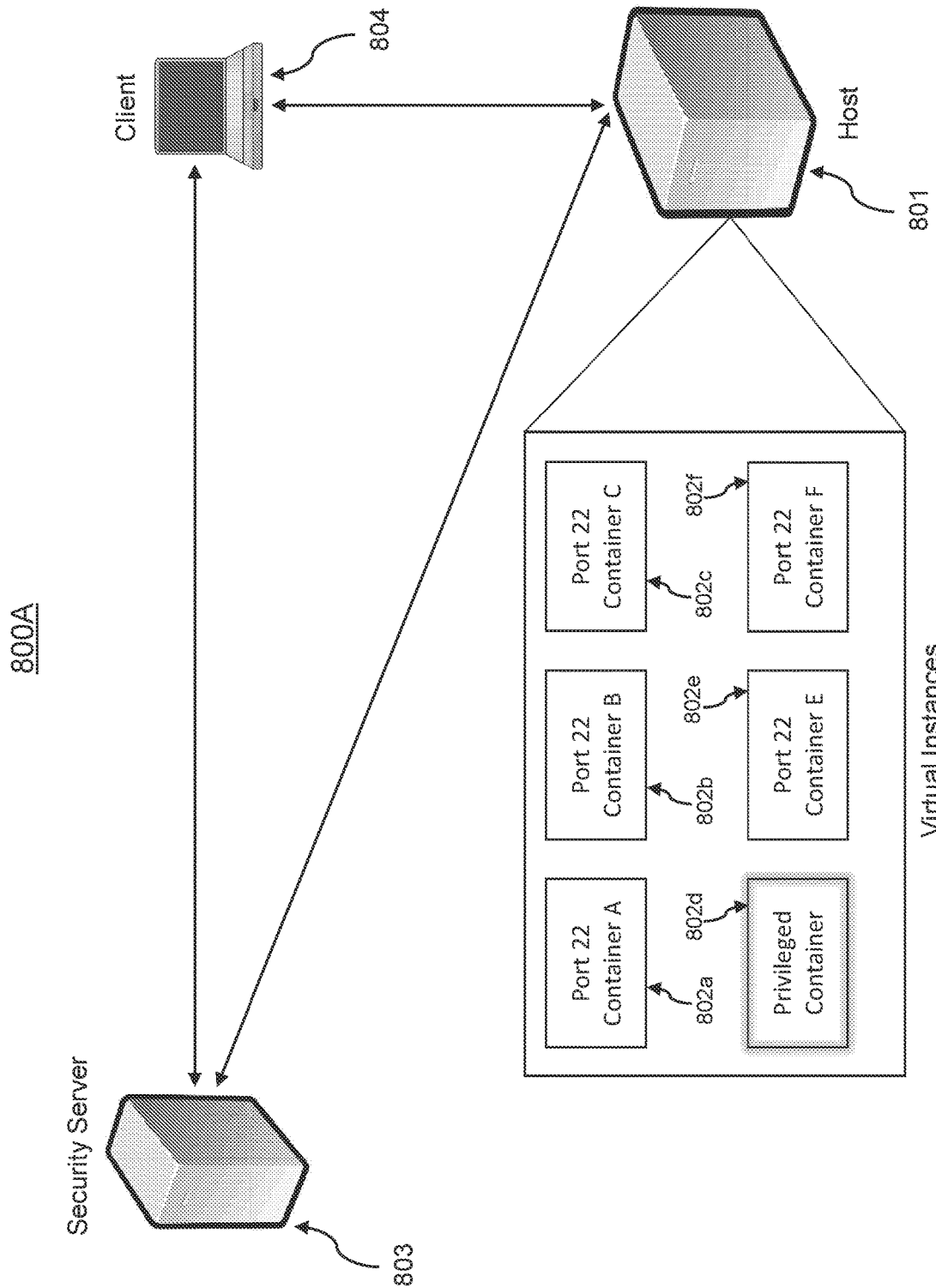

FIGS. 8A-8G illustrate block diagrams of exemplary systems 800A-800G for dynamically analyzing and enrolling virtualized execution instances 802a-802f. In accordance with systems 800A-800G, when virtual instances 802a-802f are initially spun up, initialized, identified, or registered in a virtual computing network managed by host system 801, they may be analyzed according to the techniques discussed above in connection with FIGS. 4-7. For example, the settings, parameters, and contents of virtual instances 802a-802f may be analyzed to determine whether virtual instances 802a-802f are privileged or non-privileged. Similarly, the content or sensitivity of the data to which virtual instances 802a-802f have access may be used in determining privileged risk levels. For example, if there is data in a sensitive database (e.g., personal, medical, financial, etc.) to which one or more of virtual instances 802a-802f has access, that may in turn mean that the virtual instances 802a-802f are privileged. Further, virtual instances 802a-802f may be classified in terms of their privilege score, privilege level, or privilege probability, as discussed above. With reference to FIG. 8A, for virtual instances 802a-802f determined to be non-privileged or having a privilege level or score below a threshold (e.g., virtual instances 802a-802c and 802e-802f, but not 802d), they may be automatically enrolled by security server 803, as discussed below. Once enrolled, clients 804 may be able to securely access virtual instances 802a-802c and 802e-802f according to the techniques below.

In FIG. 8A, virtual instances 802a-802f may be spun up, initialized, identified, or registered in a virtual computing network according to various different techniques. For example, as discussed in connection with operation 601 of FIG. 6, virtual instances 802a-802f may be created as part of a DevOps, continuous integration, or continuous deployment practice. Further, virtual instances 802a-802f may be created using cloud orchestration tools, such as those provided by AWS™, Azure™, IBM Cloud™, Docker™, Kubernetes™, and others. Consistent with the discussion above regarding FIGS. 1-3, virtual instances 802a-802f may take a variety of forms, such as virtual machines, container instances, next-generation containers, serverless code instances, or other virtual computing implementations.

Figure 8B:
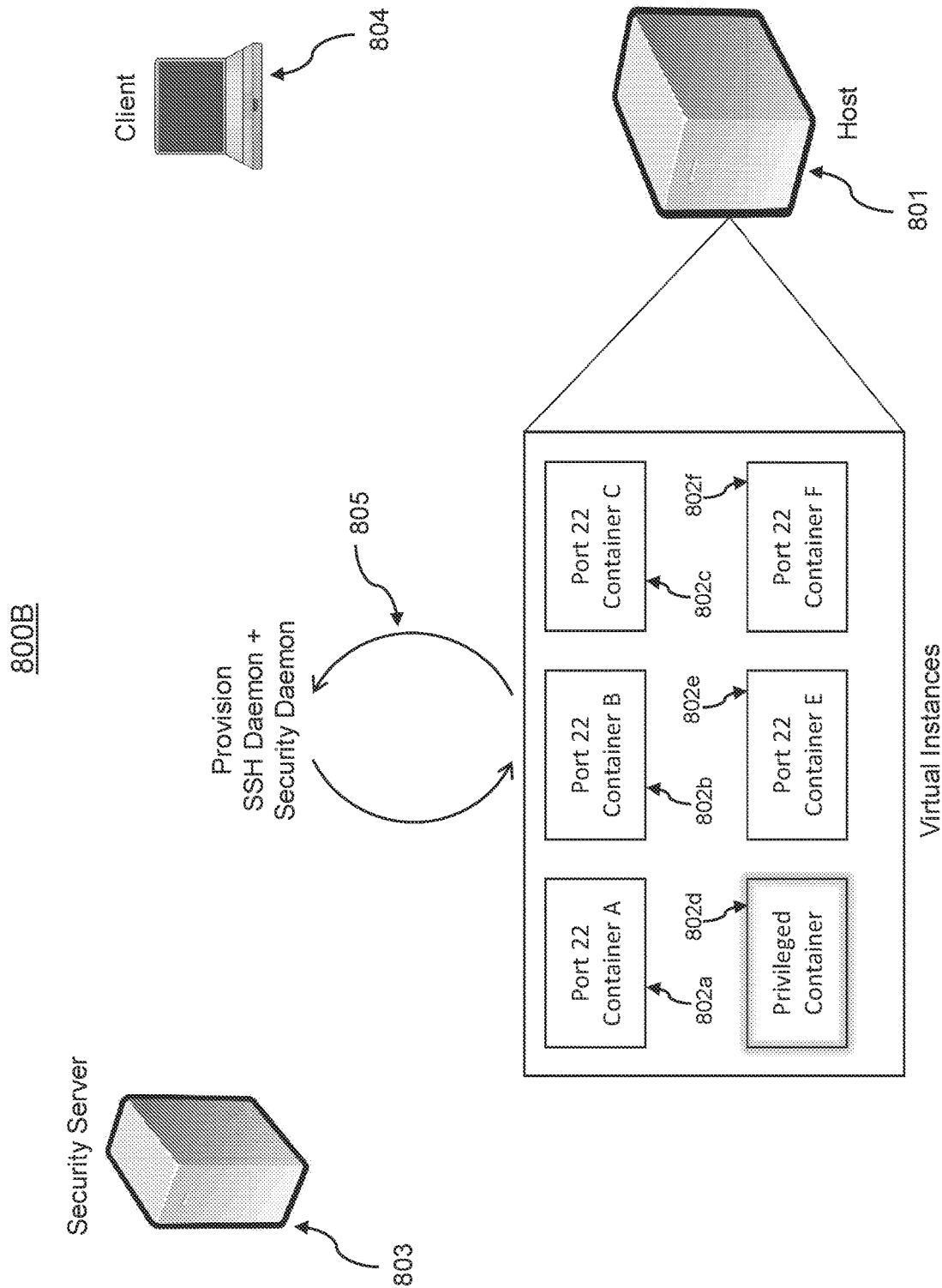

In some embodiments, as illustrated in FIG. 8B, virtual instances 802a-802f may be created with embedded daemon applications or agents, which assist in the techniques described below. For example, virtual instances 802a-802f may each have a security daemon, which assists in performing a privilege inspection for each instance, and communicating with security server 803. In some embodiments, each of virtual instances 802a-802f may also each have an SSH daemon (e.g., sshd) or other secure connection or tunneling application, which assists in establishing a secure connection with external client identities 804. As an exemplary Linux script to use when spinning up a virtual container, the following may be used: ID=$(docker run -d -e 22 ca_sshd) && docker exec $D bash -c "echo "$(docker port $ID 22/tcp |sed s/[^:]*://)†">/tmp/exposed_port". Of course, virtual instances 802a-802f may use other scripts (e.g., non-Linux) as well, and are not limited to container instances. As discussed above, virtual instances 802a-802f may be virtual machines, container instances, next-generation containers, serverless code instances, etc.

Figure 8C:
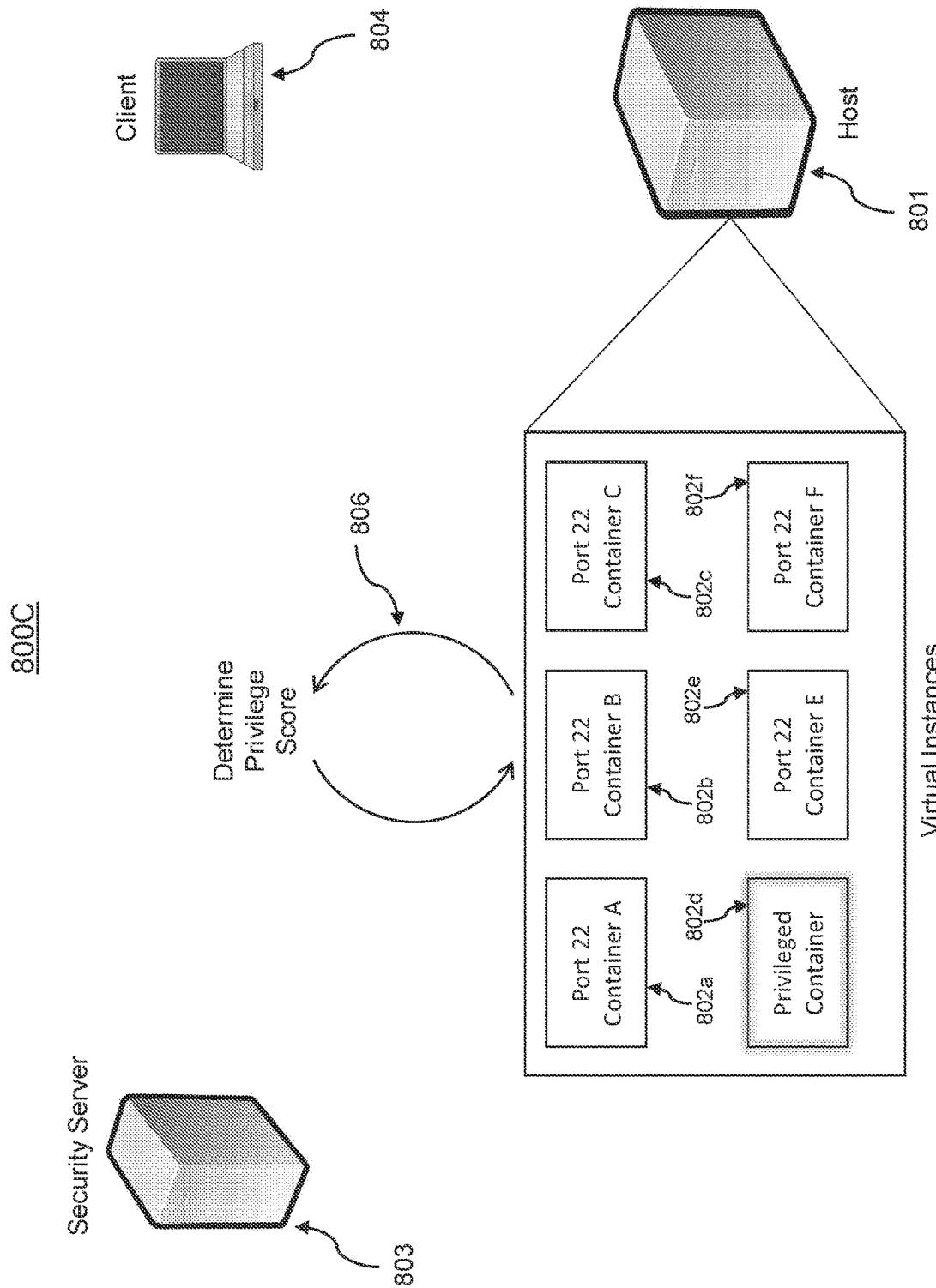

In accordance with FIG. 8C, a privilege score, level, probability, or other classification of privileged capabilities may be performed for virtual instances 802a-802f. Consistent with operation 602 of FIG. 6, and operation 702 of FIG. 7, this may involve performing a privileged capabilities inspection, which may address various attributes, flags, parameters, and capabilities of virtual instances 802a-802f. For example, the privilege inspection may address whether virtual instances 802a-802f have attributes, flags, parameters, or capabilities that enable them to escape from their virtualized environment and penetrate an environment of host 801. Additionally, consistent with the above discussion, the privilege inspection may determine whether virtual instances 802a-802f have capabilities to access sensitive data (e.g., stored in the host system, or stored in a separate system but accessible to virtual instances 802a-802f). As discussed above, the result of the privilege inspection may be expressed in a variety of forms (e.g., a binary format of privileged or non-privileged, a score or ranking of privilegedness, a category or classification of privilegedness, etc.). Further, in FIG. 8D, a port number of virtual instances 802a-802f may be determined. For example, each of virtual instances 802a-802f may have its own unique port number, each may share a common port number, or each may have a unique port number within a defined range. In some embodiments, for example, a router may be configured for virtual instances 802a-802f to each have a port number within the range of 30,000 (e.g., 30,000, 30,001, 30,002, etc.). Further, in some embodiments port numbers for virtual instances 802a-802f may be generated (e.g., upon spin-up of virtual instances 802a-802f, upon detection or identification of virtual instances 802a-802f, or after spin-up). Port numbers may thus be dynamically assigned and/or generated for virtual instances 802a-802f.

In some embodiments, virtual instances 802a-802f may be assigned or given emulation data indicative of one or more fictive information resources. For example, virtual instances 802a-802f may be designed to mimic or emulate particular network resources. In some embodiments, the data integrated into these virtual instances 802a-802f may be fictive in the sense that these virtual instances 802a-802f are not live or operational instances but rather are decoys, lures, or honeypots. According to the techniques described further below, when suspicious activity is detected regarding one or more of these virtual instances 802a-802f with emulation data (e.g., a user or application attempting to connect to one of such virtual instances 802a-802f), a control action may be triggered. For example, the control action may include revoking enrollment of the virtual instances 802a-802f (e.g., removing them from a set of enrolled instances), controlling access to the virtual instances 802a-802f (e.g., via rotating or refreshing their associated cryptographic keys, discussed below), or triggering an alert (e.g., an alert to an administrator or other system), among other possible control actions.

Figure 8E:
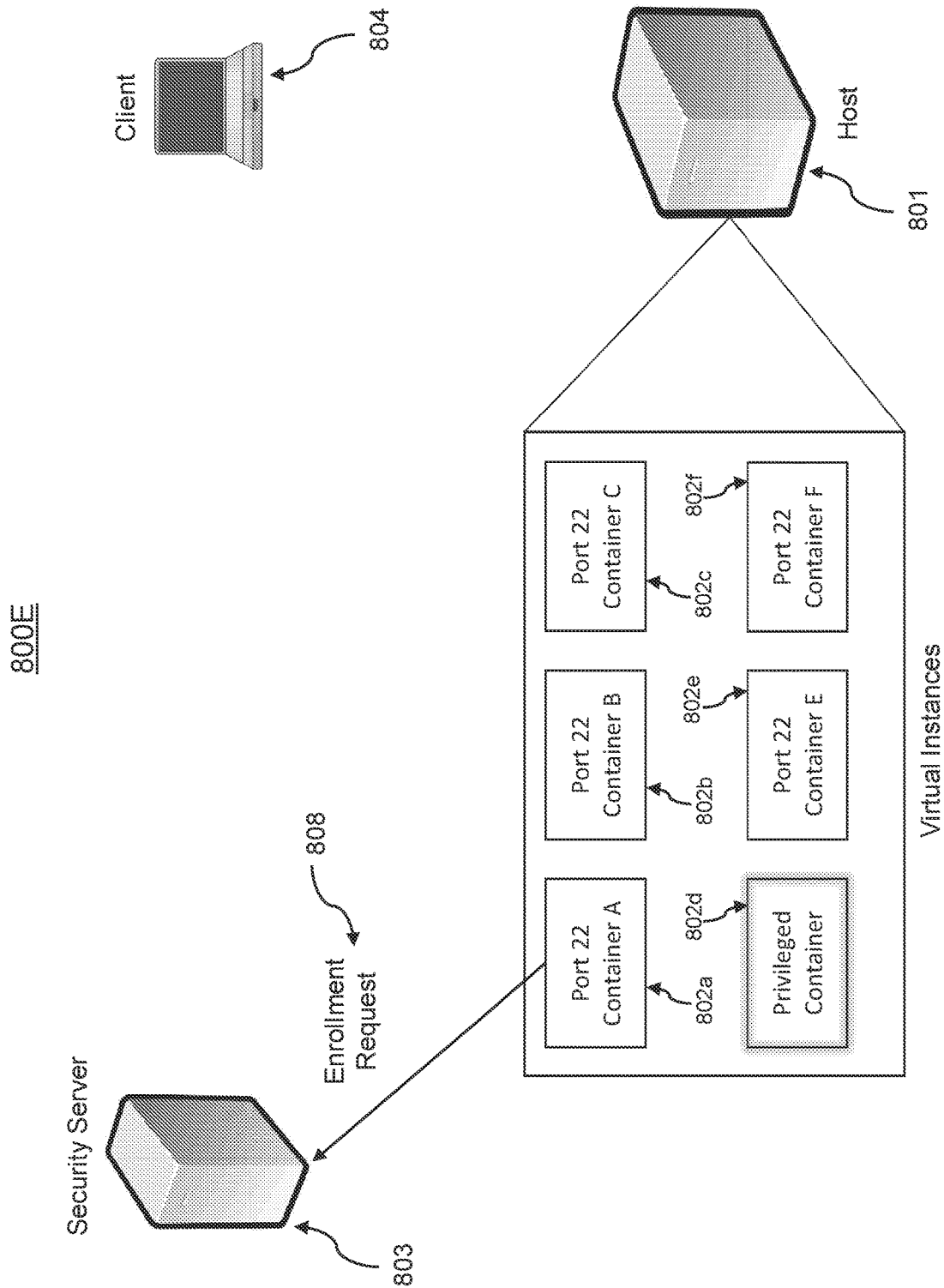
Figure 8F:
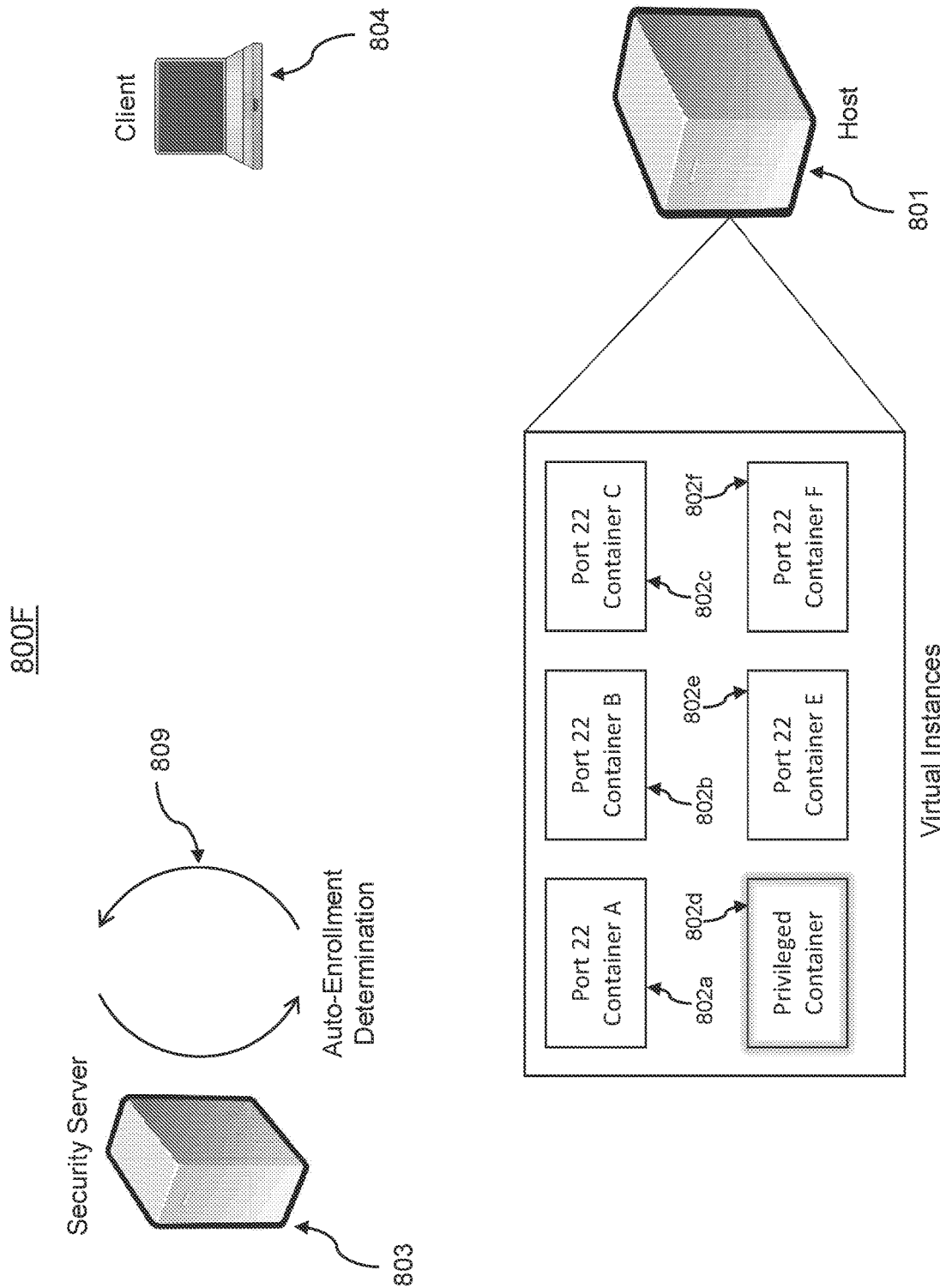

In FIG. 8E, virtual instances 802a-802f may request enrollment in an operation 808 to security server 803. Security server 803 may be, for example, an integrated network resource within the same virtualized environment has host 801, or a separate resource in a separate environment (e.g., a third-party security server). The request for enrollment 808 may take several possible forms. For example, with reference to FIG. 6, request for enrollment 808 may correspond to the identification of a virtualized execution instance in operation 601. Further, with reference to FIG. 7, request for enrollment 808 may correspond to operation 701. Consistent with the discussion above, request for enrollment 808 may involve identifying the spin-up, instantiation, or detection of a new virtual instance, or may alternatively involve an explicit request by a virtual instance for enrollment at security server 803. In some embodiments, request for enrollment 808 may be performed by a security daemon (e.g., application or agent) baked into virtual instances 802a-802f when they are initialized or initially spun up. In this regard, advantageously, a given image for virtual instances 802a-802f may be generated that contains the security daemon. Consequently, any number of virtual instances 802a-802f may be spun up from that image with the security daemon already integrated, thus allowing for potentially massive scalability. The security daemon may be configured with, for example, an IP address, domain name (e.g., HTTP/S), or other network address associated with security server 803.

In FIG. 800F, security server 803 may make a determination in operation 809 of whether to automatically enroll virtual instances 802a-802f for which it has received enrollment requests. For example, in embodiments where the privileged inspection for virtual instances 802a-802f is binary (e.g., privileged or non-privileged), non-privileged instances (e.g., instances 802a-802c and 802e-802f) may be automatically enrolled while privileged instances (e.g., instance 802d) may not be automatically enrolled. Further, in embodiments where virtual instances 802a-802f are assigned privilege scores, probabilities, levels, or other indicia of privileged capabilities, a threshold may be used such that some instances have privileged capabilities below the threshold (e.g., instances 802a-802c and 802e-802f) while others have privileged capabilities above the threshold (e.g., instance 802d).

For virtual instances 802a-802f that are determined to be automatically enrolled by security server 803 (e.g., because they are non-privileged, or have a privilege level below a threshold), such virtual instances 802a-802f may be added to a group of identities configured for secure communications with external clients 804. These techniques are further discussed below in connection with FIGS. 8G, 9A-9C, 10, and 11. On the other hand, for virtual instances 802a-802f not determined to be automatically enrolled by security server 803 (e.g., because they are privileged, or have a privilege level above a threshold), these instances may receive further scrutiny. For example, these instances may require multi-factor authentication in order to be enrolled, may require a machine-based authentication process, or may be manually reviewed.

Figure 8G:
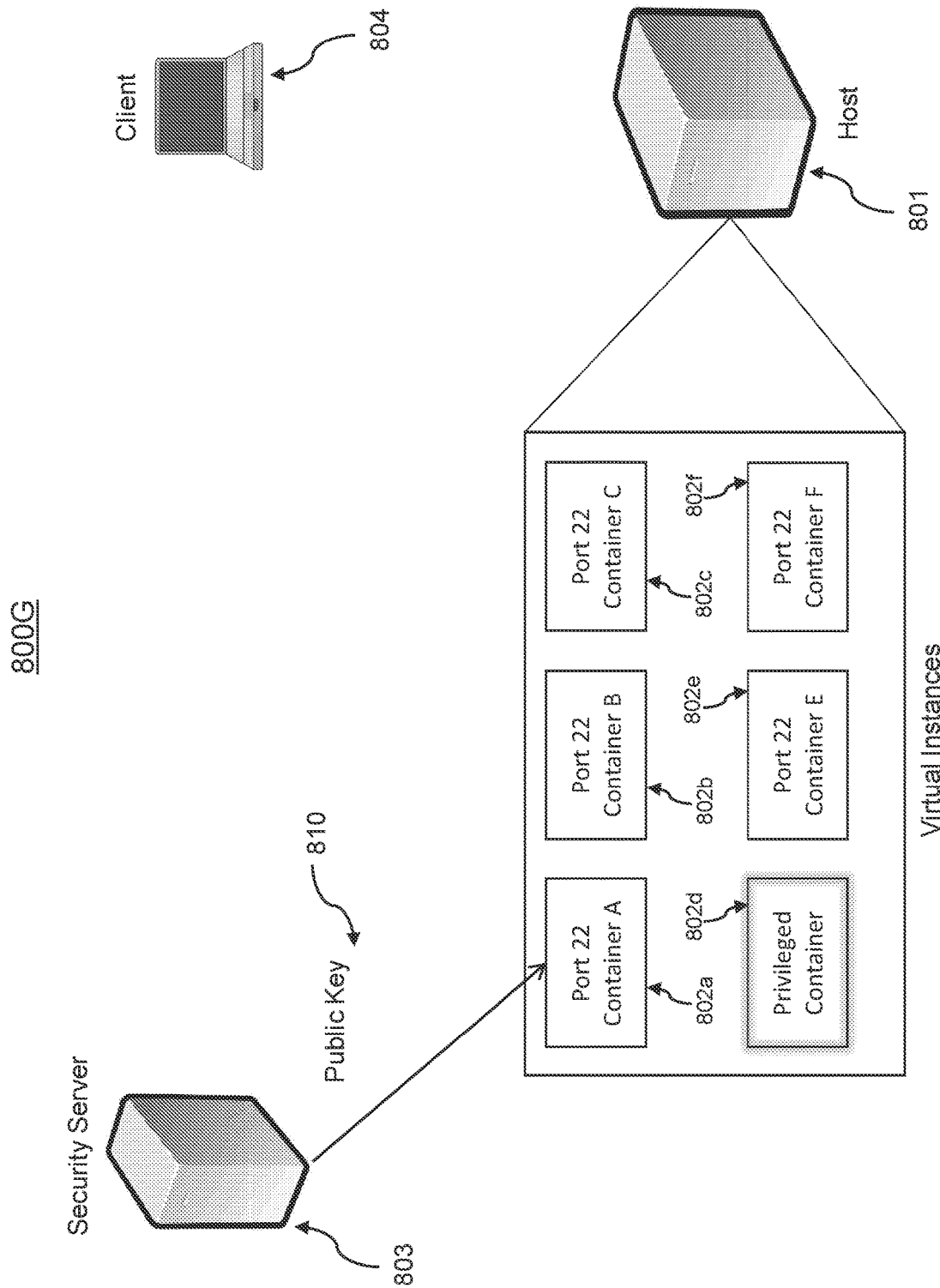

FIG. 8G illustrates security server 803 providing a public key to a virtual instance (e.g., instance 802a) in an operation 810. In some embodiments, operation 810 may include sending a certificate authority certificate to instance 802a. For example, the certificate may be associated with a certificate authority such as Symantec™, GoDaddy™, GlobalSign™, or various others. According to some implementations, the certificate may be an X.509 certificate. In some embodiments, operation 810 may involve security server 803 providing a certificate authority public key or other cryptographic key to instance 802a. The public key or other cryptographic key may be developed according to a variety of cryptographic techniques, such as RSA™, ElGamal, Diffie-Hellman, Digital Signature Standard, GPG, or others. The public key may be signed, for example, by a private key of the certificate authority. As discussed further below in connection with FIGS. 9A-9C, the cryptographic key received by instance 802a may subsequently be used in establishing secure communications with client identity 804.

Figure 9A:
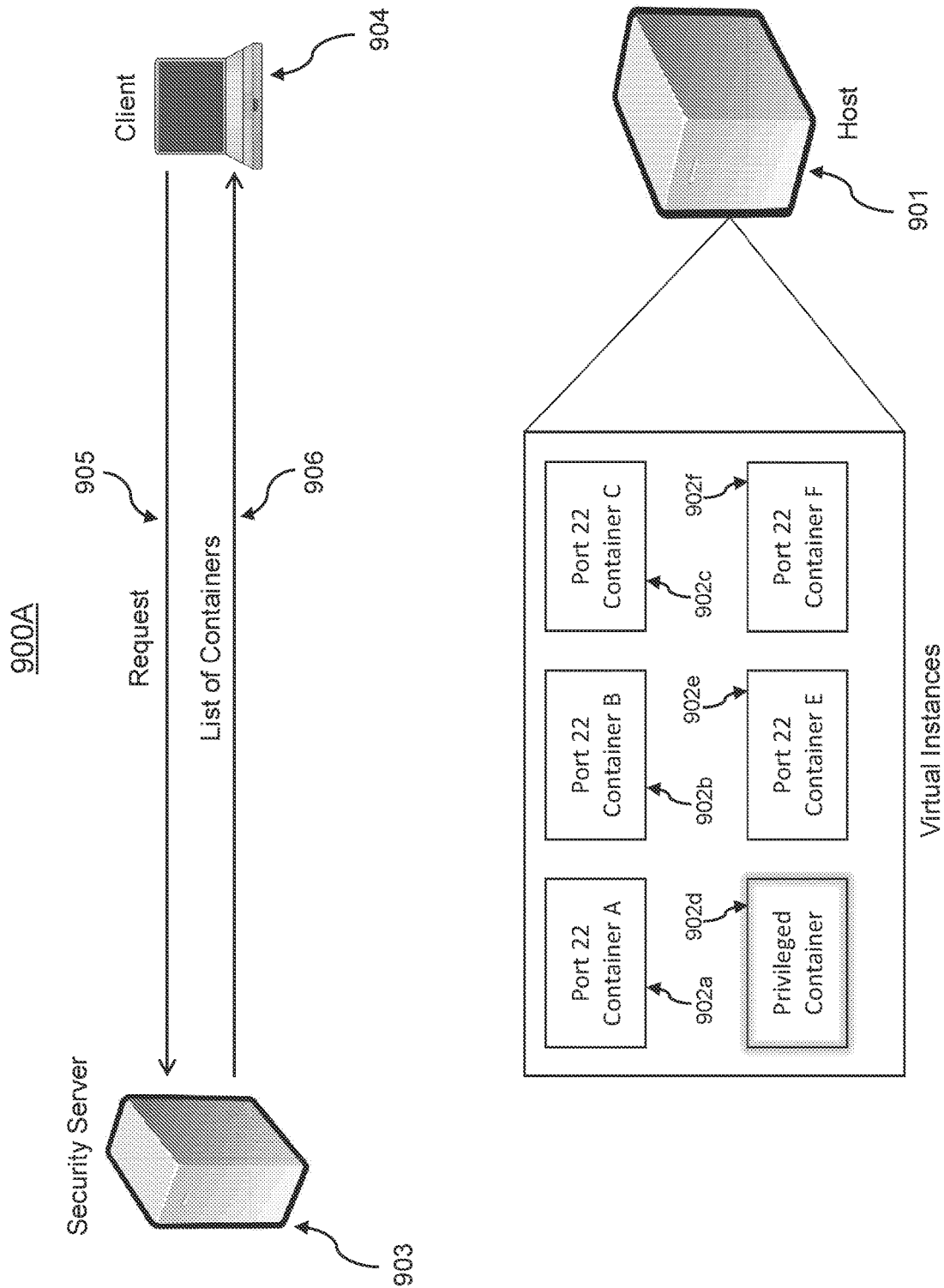
FIGS. 9A-9C illustrate block diagrams of an exemplary system for securely establishing connections to virtualized execution instances in accordance with disclosed embodiments.
Figure 9B:
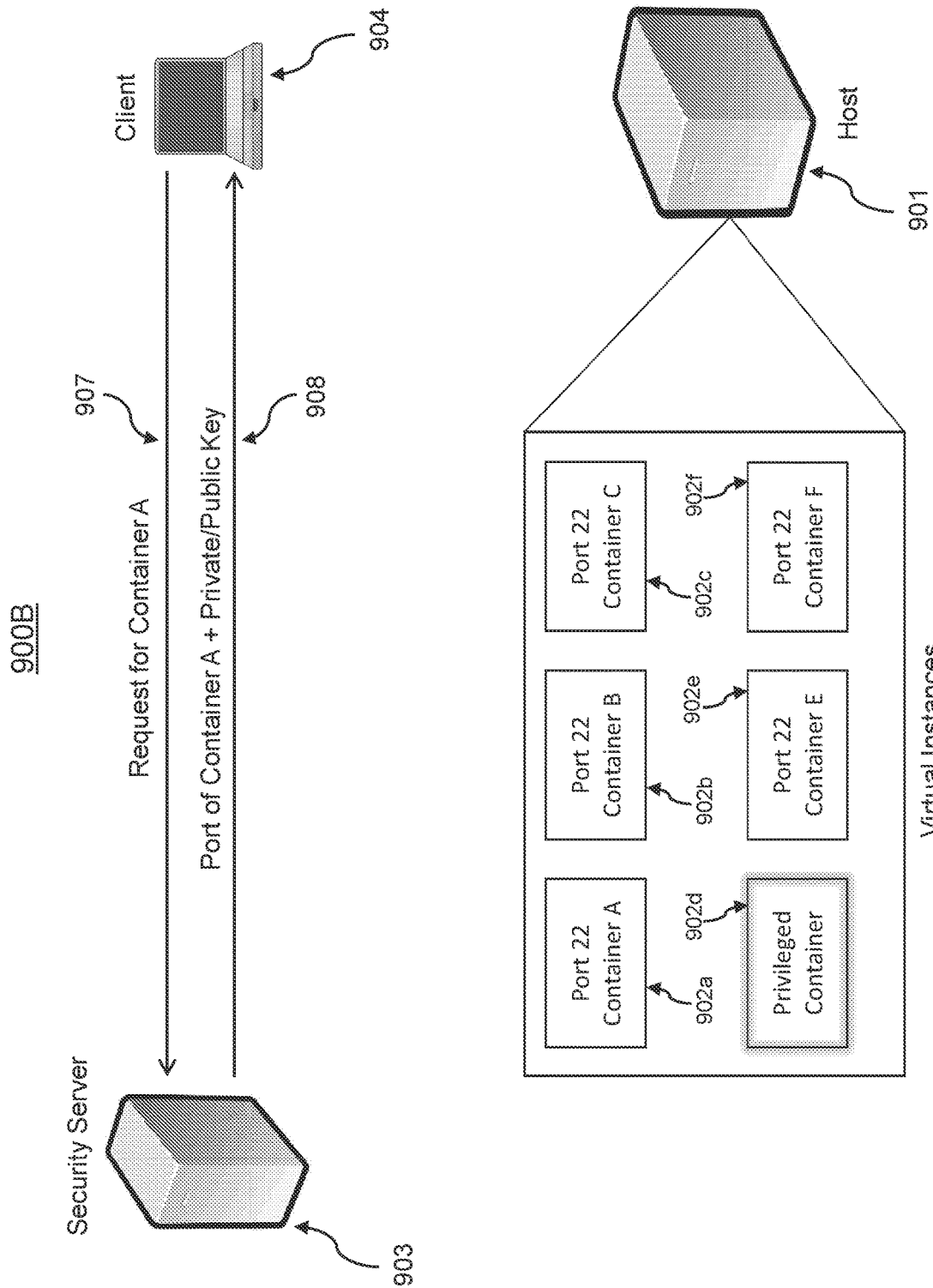
Figure 9C:
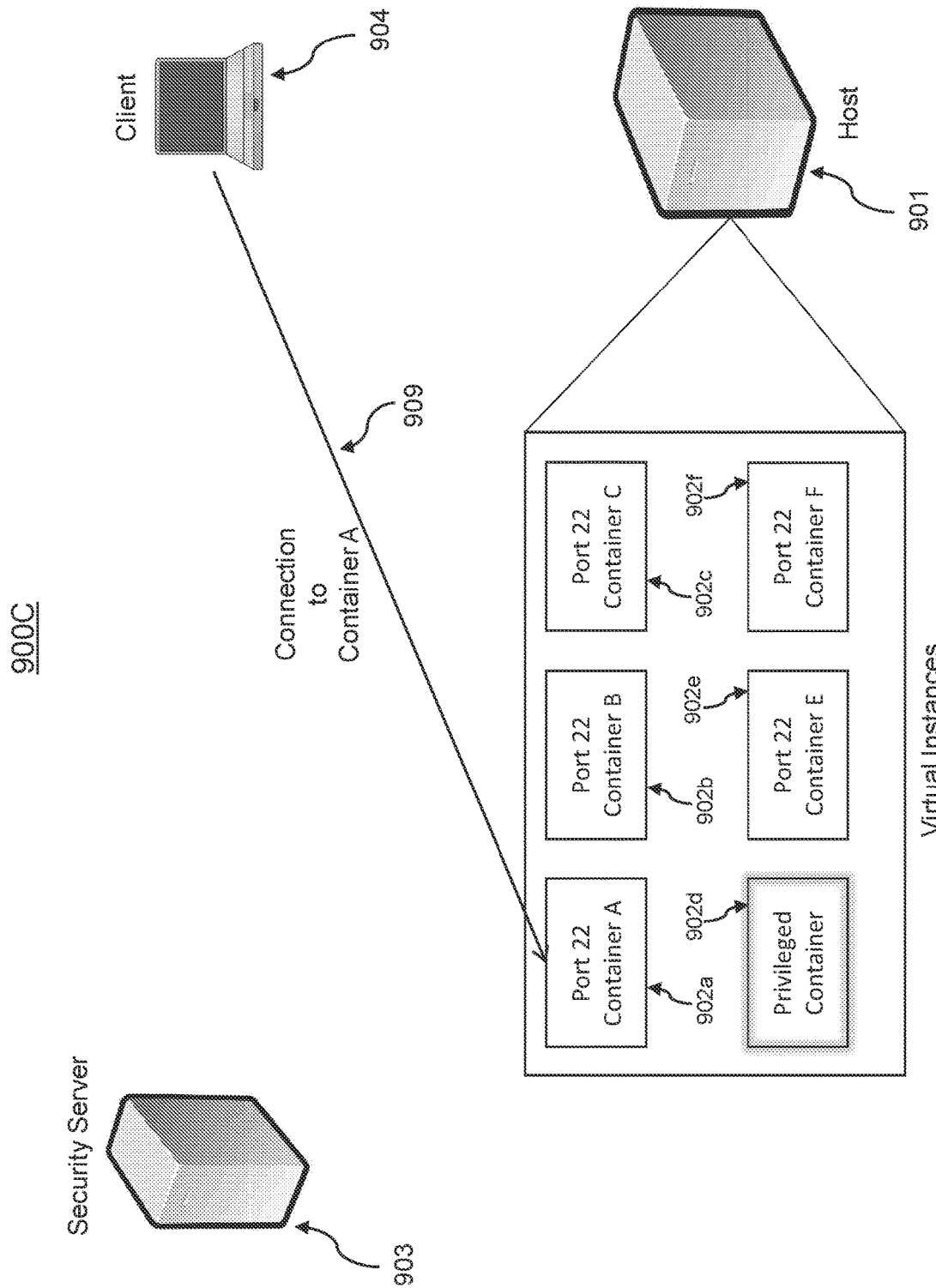

FIGS. 9A-9C illustrate block diagrams of exemplary systems 900A-900C for securely establishing connections between clients 904 and virtualized execution instances 902a-902f. As discussed above, virtual instances 902a-902c and 902e-902f may be non-privileged (or having a privilege score below a threshold), whereas instance 902d may be privileged (or having a privilege score above a threshold).

As shown in FIG. 9A, client identity 904 may be seeking access to one of virtualized execution instances 902a-902f. For example, if virtualized execution instances 902a-902f are instances of a web page, client identity 904 may be seeking to download a copy of the web page. Further, if virtualized execution instances 902a-902f are instances of a database or virtualized application, client identity 904 may be seeking access to those resources. In some embodiments, client identity 904 may be a user or user-operated application (e.g., web browser or other client application). In further embodiments, client identity 904 may be an automated process or application, which is configured to access one or more of virtualized execution instances 902a-902f according to its own programming. For example, client identity 904 may be an auditing tool, a backup application, a data export or import function, a monitoring service, etc.

In accordance with FIG. 9A, client 904 may send a request to security server 903 in operation 905. In some embodiments, request 905 may be made when client 904 seeks to perform its functions involving access to virtualized execution instances 902a-902f. In further embodiments, request 905 may be performed automatically by client 904 (e.g., upon log-on to client 904, upon unlocking of client 904, upon accessing a particular application that includes communications with virtualized execution instances 902a-902f, etc.). Further, in some embodiments request 905 may be made directly to security server 903 (e.g., addressed via IP address, domain name, etc., to security server 903), while in other embodiments request 905 may be made to host 901 or virtualized execution instances 902a-902f and intercepted. For example, request 905 may be intercepted by a proxy server or by an agent running on client 904, and rerouted to security server 903 if request 905 seeks access to one of virtualized execution instances 902a-902f. In some embodiments, request 905 is made by a client application running on client 904, while in other embodiments request 905 is made by a security daemon running on client 904 as discussed above.

In response to request 905, security server 903 may return to client 904 in operation 906 a list of one or more virtual instances (e.g., one or more of virtualized execution instances 902a-902f) that have been enrolled and are available for access by client 904. Consistent with the above discussion, instances 902a-902c and 902e-902f may be enrolled and part of the list provided in operation 906, while privileged instance 902d may not. Further, as discussed above, instances 902a-902c and 902e-902f may be enrolled at security server 903 such that they have received a cryptographic key (e.g., certificate authority certificate, or public key) from security server 903 and/or provided their port number to security server 903. The list of containers received in operation 906 may be either stored (e.g., cached) at client 904 for future use, or may be stored temporarily for use in a particular requested connection to instances 902a-902c and 902e-902f.

As shown in FIG. 9B, once client 904 has received a list of one or more enrolled instances 902a-902c and 902e-902f, client 904 may transmit a request 907 to security server 903 seeking access to a particular one of instances 902a-902c and 902e-902f that is enrolled. In alternative embodiments, request 907 may be unnecessary and not performed. For example, in some embodiments as part of operation 906 (discussed above in connection with FIG. 9A), security server 903 may select a particular one of instances 902a-902c and 902e-902f to make available to client 904, in which case client 904 need not receive a list of available instances 902a-902c and 902e-902f in operation 906. Regardless of whether client 904 receives a list of enrolled instances 902a-902c and 902e-902f, or a selected one of instances 902a-902c and 902e-902f, in operation 908 client 904 may receive from security server 903 information useful in establishing a connection to a particular one of instances 902a-902c and 902e-902f. For example, as part of operation 908 security server 903 may provide the particular port number of the instance (e.g., as provided by the instance during enrollment). Further, in some embodiments security server 903 may provide client 904 with a cryptographic key pair (e.g., asymmetric private and public key pair, or symmetric key). In some implementations, the key pair may be signed with a certificate authority certificate (e.g., certificate corresponding to the certificate or key provided to the instance during enrollment, as discussed above). The public key transmitted to client 904 may be signed using a private certificate authority key, which corresponds to the certificate authority public key previously provided to the instance during enrollment. In some embodiments, before the private-public key pair is provided to client 904, client 904 may be prompted to authenticate itself (e.g., via a password, biometric attribute, two-factor authentication, secretless or credentialess authentication, etc.) to security server 903. Further, while in some embodiments security server 903 may provide the private-public key pair to client 904, in other embodiments a separate credentials repository (e.g., CyberArk™ vault) may be used to supply the keys.

Once client 904 has obtained the cryptographic keys (e.g., private-public key pair or symmetric key) from security server 903 as discussed above, client 904 may seek access to a container among instances 902a-902f. For example, as shown in FIG. 9C, client 904 may seek access to virtual instance 902a. Virtual instance 902a may then validate the requesting client 904. For example, because client 904 has received a public key that was signed with a certificate authority private key, instance 902a may be able to verify whether the public key is actually generated by the certificate authority. Otherwise, the public key may be deemed fraudulent or false. Further, the virtual instance 902a may be able to confirm that the public key was actually sent from security server 903 (i.e., the trusted or known source of the private-public key pair of the certificate authority). In some embodiments, where client 904 attempts to connect to virtual instance 902*a* over an SSH (or other secure) connection, virtual instance 902*a* may be running an SSH (or other) daemon, as discussed above. The daemon on virtual instance 902*a* may receive the public key from client 904 and verify whether it is correctly signed by the certificate authority. If the public key is verified, an SSH (or other secure) connection between the virtual instance 902*a* and client 904 may be established, whereas if the public key is not verified a secure connection may be denied.

In embodiments where security server 903 sends a private-public key pair to virtual instance 902*a*, added security may be provided if the key pair is given a short time-to-live or expiration attribute, or is nullified or invalidated after a short time period. Thus, even if client 904 or another entity is able to cache the private-public key pair and attempt to use them in the future, such use may be prevented.

Notably, in accordance with the secure access techniques of FIGS. 9A-9C, clients 904 may be able to access non-privileged (or only weakly privileged) instances 902*a*-902*f*, but not be able to escape from the instances themselves and obtain access to host 901. For example, if a client 904 accesses an instance that has an SSH daemon with a security vulnerability, while the client 904 may have access to the instance itself, the client 904 will not be able to escape from the instance to penetrate host system 901 or access sensitive data (from host system 901 or external sources). Secure access to non-privileged instances 902*a*-902*f* may be provided in this way in an automatic manner, which is efficient and scalable as the number of instances grows and/or the number of requesting clients grows.

Another advantage flowing from the above techniques is that virtual instances need not have permanent (e.g., hard-coded) keys in their images. Instead, as discussed above, cryptographic keys may be prepared on an as-needed or just-in-time basis when clients 904 seek access to virtual instances, and keys for instances 902*a*-902*f* themselves may be provisioned upon enrollment. Further, the provisioned cryptographic keys may be set to expire periodically, for added security. Similarly, with respect to the certificate authority public keys that may be transmitted to enrolled instances 902*a*-902*f*, those public keys may be provisioned after instances 902*a*-902*f* are already spun up or initialized. This allows, consequently, images for instances 902*a*-902*f* to be created without public keys (e.g., as secretless or empty images).

A further advantage of the above techniques is that, once security server 903 has enrolled non-privileged (or weakly privileged) instances 902*a*-902*f*, security server 903 may be able to dynamically and flexibly permit access to particular clients 904 but not all clients 904. This may allow for customized access tailored to the environment in which instances 902*a*-902*f* are instantiated and operated. Further, this may allow for dynamically changing access to instances 902*a*-902*f* by particular clients 904. Likewise, as instances 902*a*-902*f* themselves are dynamically spun up and spun down, secure access to them may be provided to particular clients 904. For enrolled virtual instances, the above techniques may further limit or restrict access to the virtual instances only in terms of an isolated environment of the instances themselves (e.g., an environment lacking access to the host, a read-only environment, etc.). Additionally, in some situations access may be limited to a particular virtual instance itself, and denied with respect to other virtual instances.

Figure 10:
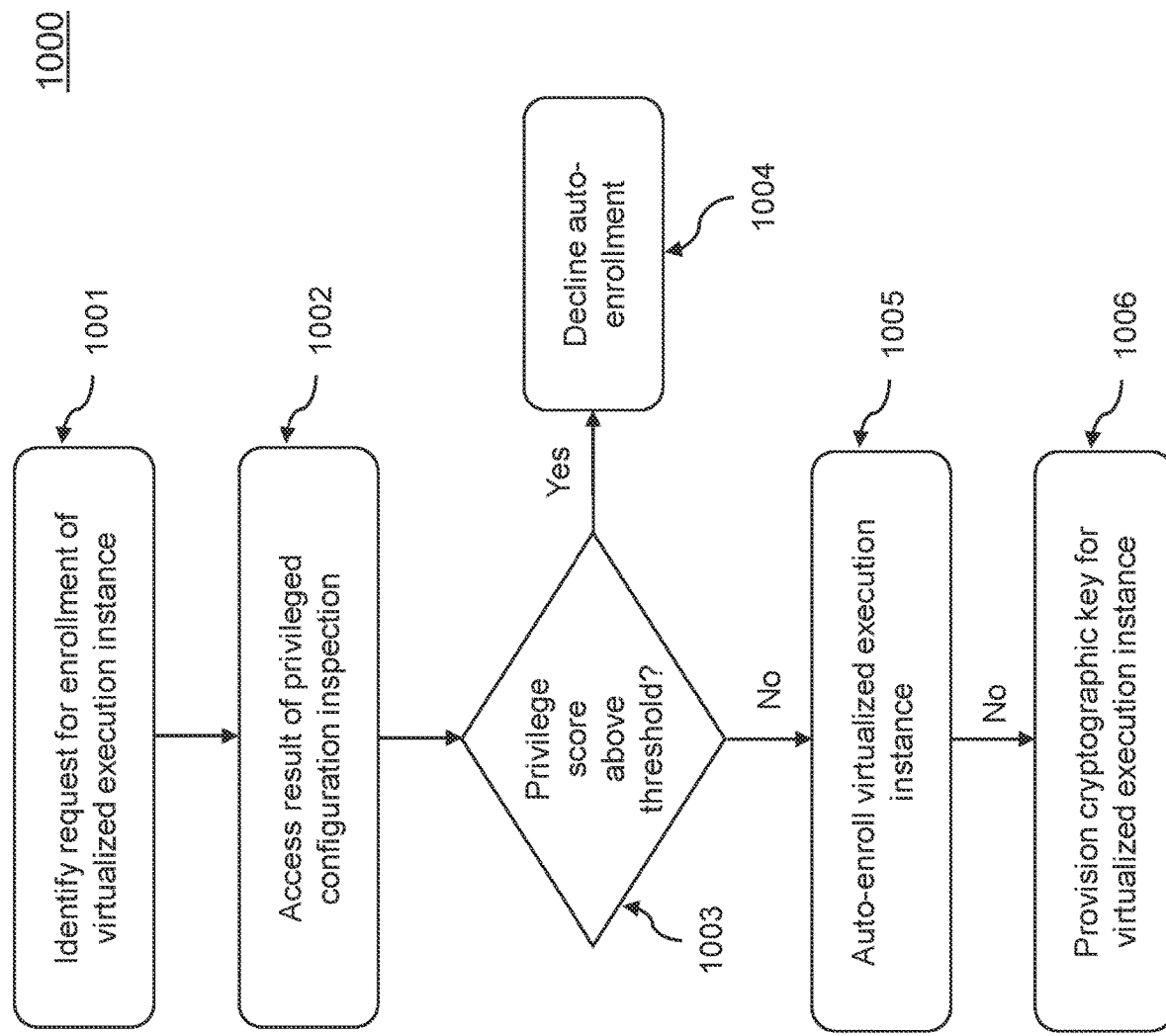
FIG. 10 is a flowchart depicting an exemplary process for dynamically analyzing and enrolling virtualized execution instances in accordance with disclosed embodiments.

FIG. 10 is a flowchart depicting an exemplary process 1000 for dynamically analyzing and enrolling virtualized execution instances. In accordance with above embodiments, process 1000 may be performed in the system environments of FIGS. 1, 3-5, 8A-8G, and 9A-9C. For example, process 1000 may be performed by servers 109 of FIG. 1, security server 803 of FIGS. 8A-8G, or security server 903 of FIGS. 9A-9C.

In an operation 1001, process 1000 may include identifying a request for enrollment for a virtualized execution instance configured to be deployed on a host in a virtual computing environment. As discussed above in connection with FIGS. 8A-8E, for example, once a virtual instance (e.g., instance 802*a*) is spun up, initialized, or detected, the instance 802*a* may be provisioned with one or more daemon applications or agents (e.g., an SSH daemon and a security daemon). The daemons may be provided by a cloud orchestration tool, by host 801, or by security sever 803, for example. Further, consistent with various embodiments described above, a privilege score, level, probability, or other determination may be made for instance 802*a*. In some embodiments, the privilege determination may be made by a daemon (e.g., security daemon) baked into instance 802*a*. In accordance with the embodiments discussed above, the privileged configuration inspection may be based on whether the instance 802*a* has been configured with one or more attributes that can permit operation of the instance 802*a* to perform operations, beyond an environment of the instance 802*a*, on an environment of the host 801, or to access sensitive data (e.g., from host 801 or externally).

Once this privileged configuration inspection is made, a result of the inspection (e.g., classification of privileged or non-privileged, score, probability, etc.) for instance 802*a* may be provided to security server 803. The result of the privileged configuration inspection may be provided to security server 803, in some embodiments, together with a network address (e.g., IP address) and/or port number associated with instance 802*a*. As discussed above, the request from the instance 802*a* to the security server 803 may be an express request for enrollment of instance 802*a*, or may be simply a notification that instance 802*a* has been spun up or initialized.

In operation 1002, process 1000 may include accessing from instance 802*a* (or from host 801, or a separate orchestration platform tool) the result of the privileged configuration inspection. As discussed above, the result may indicate a binary status of the instance 802*a* (e.g., privileged or non-privileged), a numerical score of privilegedness for the instance 802*a*, a ranking or probability of privilegedness for the instance 802*a*, or other classifications of whether (and to what extent) instance 802*a* has privileged capabilities.

In operation 1003, process 1000 may include comparing the result of the privileged inspection to a threshold. For example, if the score, ranking, or probability of privilegedness for the instance 802*a* is expressed numerically, the threshold may correspondingly be numerical. As an illustration, if the privilege score range for instances is 1-100, with 100 being maximum or full privileged capabilities, a threshold may be set of 10 on the range. If instance 802*a* has a privilege score of 1-10, it may be deemed ready for automatic enrollment and process 1000 may proceed to operation 1005. On the other hand, if instance 802*a* has a score above 10, process 1000 may proceed to operation 1004, where automatic enrollment is declined. As discussed above, for virtual instances where automatic enrollment is declined (e.g., in operation 1004), further scrutiny may be applied to those instances. For example, such virtual instances may be required to participate in authentication, two-factor authentication, or manual review. In embodiments where the result of the privilege inspection for instance 802a is binary in nature (e.g., privileged or non-privileged), operation 1003 may not be needed. For example, if instance 802a is non-privileged process 1000 may proceed to operation 1005, while if instance 802a is privileged process 1000 may proceed to operation 1004.

In operation 1005, process 1000 may include determining, based on the result of the privileged configuration inspection, to automatically enroll the virtualized execution instance. As discussed above, in some embodiments this may involve registering instance 802a as an enrolled instance. For example, instance 802a may be included in a database along with identifying information (e.g., an IP address, port number, instance name or identification number, author or creator, time of creation, date of creation, privileged inspection result, time of privileged inspection, date of privileged inspection, etc.). Further, in some embodiments instance 802a may be defined in a database in terms of the functionality instance 802a is configured to perform (e.g., web page functionality, application functionality, database functionality, auditing functionality, backup functionality, etc.). By including this descriptive information about instance 802a in the database, security server 803 may later be able to better determine which particular client identities 804 should be permitted to access instance 802a. Accordingly, the database may maintain information regarding instance 802a, and other enrolled instances, so that the database may be queried when security server 803 decides which client identities 804 should be permitted access to the instances.

In operation 1006, process 1000 may include provisioning instance 802a with a cryptographic key. For example, as discussed above, security server 803 may provide to instance 802a upon enrollment a certificate authority public key. Instance 802a may then retain the key for use in validating communications from client identities 804.

Figure 11:
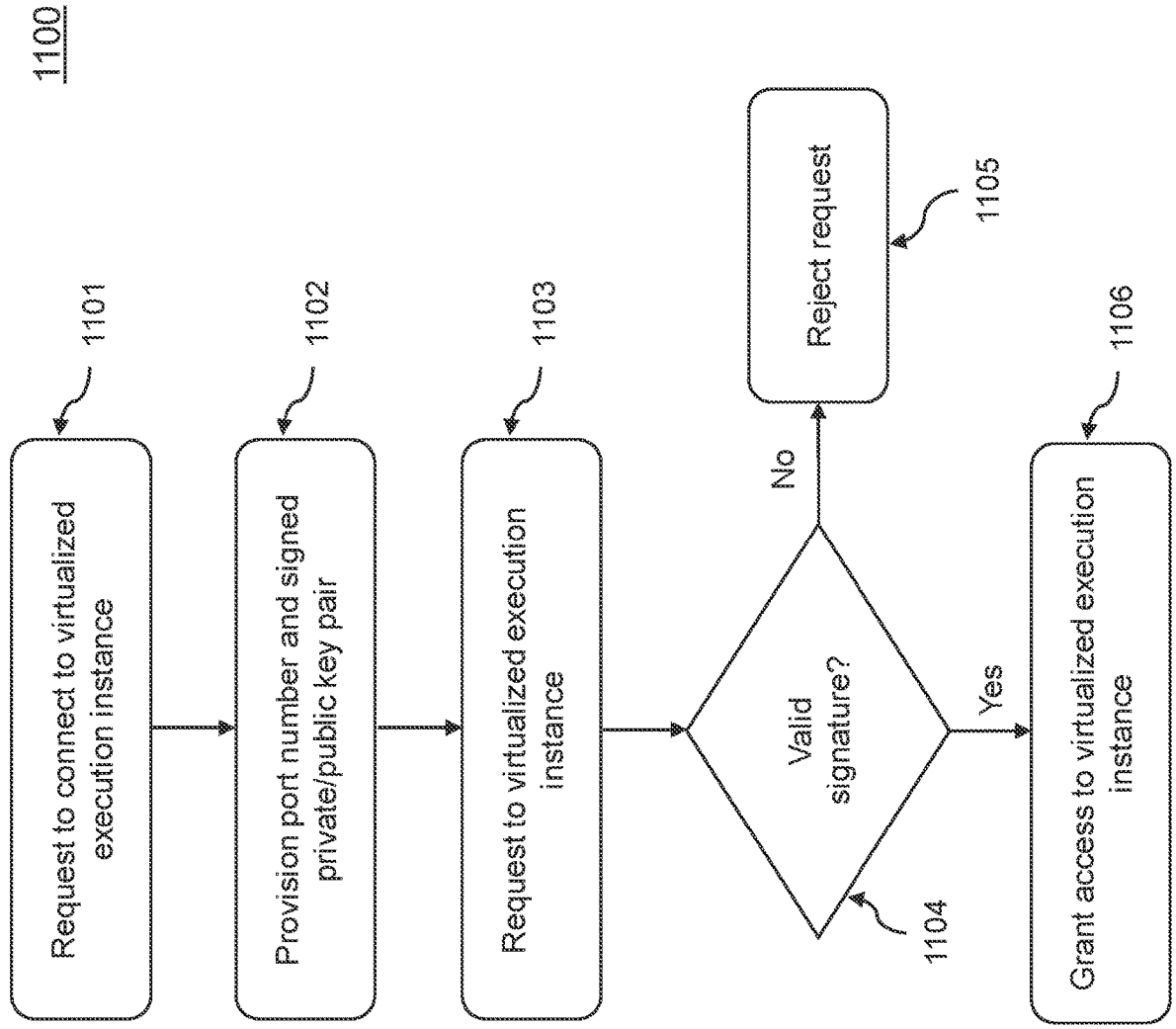
FIG. 11 is a flowchart depicting an exemplary process for securely establishing connections to virtualized execution instances in accordance with disclosed embodiments.

FIG. 11 is a flowchart depicting an exemplary process 1100 for securely establishing connections to virtualized execution instances. In accordance with above embodiments, process 1100 may be performed in the system environments of FIGS. 1, 3-5, 8A-8G, and 9A-9C. In some embodiments, process 1100 may be performed once one or more virtual instances 902a-902f have been enrolled by security server 903.

In an operation 1101, process 1100 may include identifying a request to connect to a virtualized execution instance, such as one of virtual instances 902a-902f. As discussed above, the request may be made from a client identity 904. For example, the request may be made from an application associated with client identity 904 to a security daemon running on client 904, and then from the security daemon to security server 903. Alternatively, the request may be made from client identity 904 to security server 903. The request, in some embodiments, may be associated with a particular application that client 904 seeks to access (e.g., a web page, a virtualized application, a virtualized database, etc.). Further, in some embodiments the request may be associated with a particular virtual instance 902a-902f.

In an operation 1102, process 1100 may include provisioning a port number and/or cryptographic key pair for the client 904. For example, as discussed above, when a particular virtual instance 902a-902f is enrolled at security server 903, the port number of the virtual instance may be registered with security server 903. Accordingly, operation 1102 may include providing that port number to client 904. Further, as described above, operation 1102 may include providing a public/private key pair to client 904. For example, the security server 903 may send to client 904 a private key and public key, where the public key is signed using a private certificate authority key. The private key may correspond to the certificate authority public key previously sent to the virtual instance 902a-902f during enrollment.

Because the virtual instance 902a-902f has already received a certificate authority public key during enrollment, in operation 1104 process 1100 may include determining whether the received signature (e.g., the signature of the public key received by client 904) is valid. Because the public key has been signed with the private key of the certificate authority, the virtual instance 902a-902f may be able to verify whether the key was actually generated by the certificate authority. If so, process 1100 may continue to operation 1106. In operation 1106, the client 904 may be able to particulate in secure communications (e.g., via SSH or other secure techniques) with virtual instance 902a-902f. Notably, as discussed above, the secure session may permit client 904 with access to virtual instance 902a-902f itself, but not access to the host 901 on which virtual instance 902a-902f operates. On the other hand, if the signature is not validated in operation 1104, process 1100 may proceed to operation 1105, where the request from client 904 to access virtual instance 902a-902f (e.g., a request via an SSH session or other secure session) is rejected.

In some embodiments, an administrator, e.g., a docker/kubernetes administrator, may wish to load a container or multiple containers (e.g., a set or grouping) with one or more special assets. These assets may be, for example, files or directories copied from the host (e.g., host 304, 402, 502, 801, or 901 as discussed above) to the container, or certain devices (e.g., USB units, hard drives, cameras, etc.) loaded into the container. In some instances, the container policy governing the container (e.g., set by an orchestrator, as discussed above) may strictly deny such requests to include special assets inside the container because those containers may become privileged and break the isolation between container and the system. However, some applications may require access to such assets in order to carry out their programmed functionality or permitted operations. In these cases, the administrator may not be able to run the container's process without access to that asset. For example, runtime protections may not allow such assets inside a container.

Figure 12:
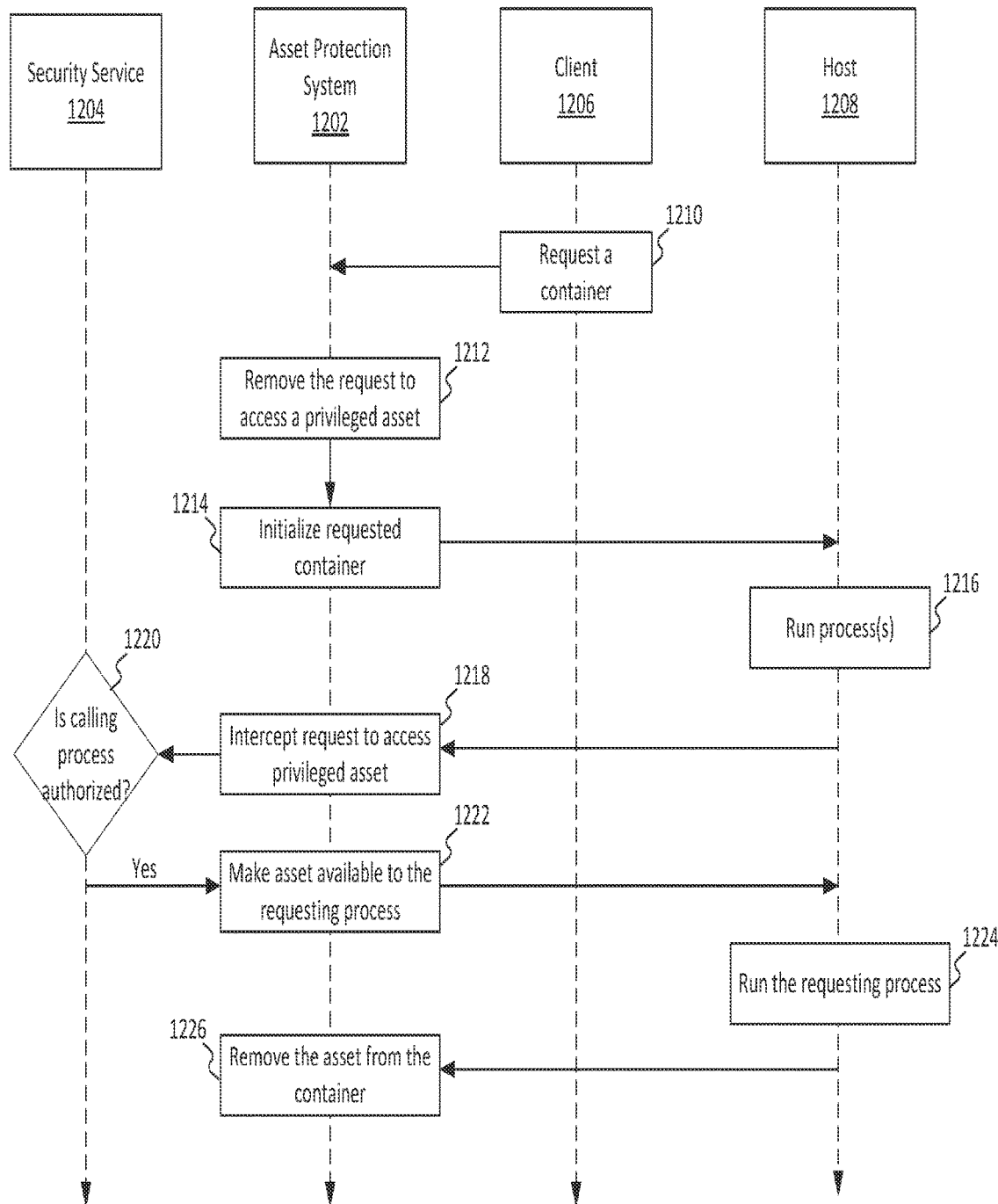
FIG. 12 illustrates a process flow of an exemplary system for securely provisioning sensitive data elements to virtualized execution instances in accordance with disclosed embodiments.

FIG. 12 illustrates a system 1200, consistent with disclosed embodiments. The system 1200 may include an asset protection system 1202, which may allow an admin to run a container's process while accessing a required asset. System 1200 may further include a security service 1204, a client 1206, and a host 1208. The security service 1204, client 1206, and host 1208 may be the same as, or similar to, security server 803/903, client 804/904, and host 801/901 as described with reference to FIGS. 8A-8G and 9A-9C.

In system 1200, the asset protection system 1202 may monitor requests to run new containers. For example, at step 1210, client 1206 may request a container. Alternatively, the request may come from other resources in further embodiments (e.g., from a cloud orchestrator or other virtual environment management tool). Asset protection system 1202 may receive or intercept the request, which may include a request to access a privileged asset. The request may include an indication of one or more processes requesting access to a privileged asset. At step 1212, asset protection system 1202 may remove the request to access the privileged asset from a list of container attributes. Thus, the container may be initiated without the ability to access the privileged asset.

At step 1214, asset protection system 1202 may communicate with host 1208 to initialize the container, where the container is initiated without the requested privileged asset. In some embodiments, the container may be a new virtualized execution instance, which may take various different forms as discussed above.

The created container, on host 1208, may run one or more processes at step 1216. While the one or more processes are running in the container, asset protection system 1202 may monitor the container. For example, asset protection system 1202 may monitor process calls and other operations executed by the processes running on the container. Further, asset protection system 1202 may monitor requests to debug the container or the host 1208. As discussed above, a debugging operation may be an avenue for attack by a malicious identity, and thus detecting whether such debugging is underway may be helpful in order to enhance security.

At step 1218, asset protection system 1202 may intercept a request to access a privileged asset from a process running on the created container. At step 1220, asset protection system 1202 may communicate with security service 1204 to check that the calling process is authorized to access the privileged asset. For example, this may involve authenticating the calling process or container, referencing a whitelist of calling processes or containers, etc. If the calling process is authorized, at step 1222 asset protection system 1202 may mount or otherwise make the asset available to the calling process in the container. For example, the asset protection system may directly provide the asset (e.g., files, directories, credentials, etc.) to the to the container, may provide a link (e.g., URL, URI, etc.) to the container, may instruct a virtual orchestration platform to provide the asset to the container, etc.

At step 1224 the calling process may run in the container. In some embodiments, the calling process may be locked down during the time it accesses the privileged asset. For example, asset protection system 1202 may prevent other processes from accessing or performing operations on a memory associated with the calling process. Further, asset protection system 1202 may block requests to debug the container or host 1208.

At step 1226, asset protection system 1202 may receive an indication that the process is releasing the asset and may remove the asset from the container. The indication may be, for example, a call to close( ) syscall on the asset. Accordingly, the system 1200 may securely provision sensitive data elements (e.g., secrets, credentials, files, directories, etc.) to virtualized execution instances. Further, in accordance with these techniques the sensitive data elements may be deleted when appropriate. For example, sensitive data elements may be deleted when a session ends involving the container, upon a period of time expiring, etc.

Figure 13:
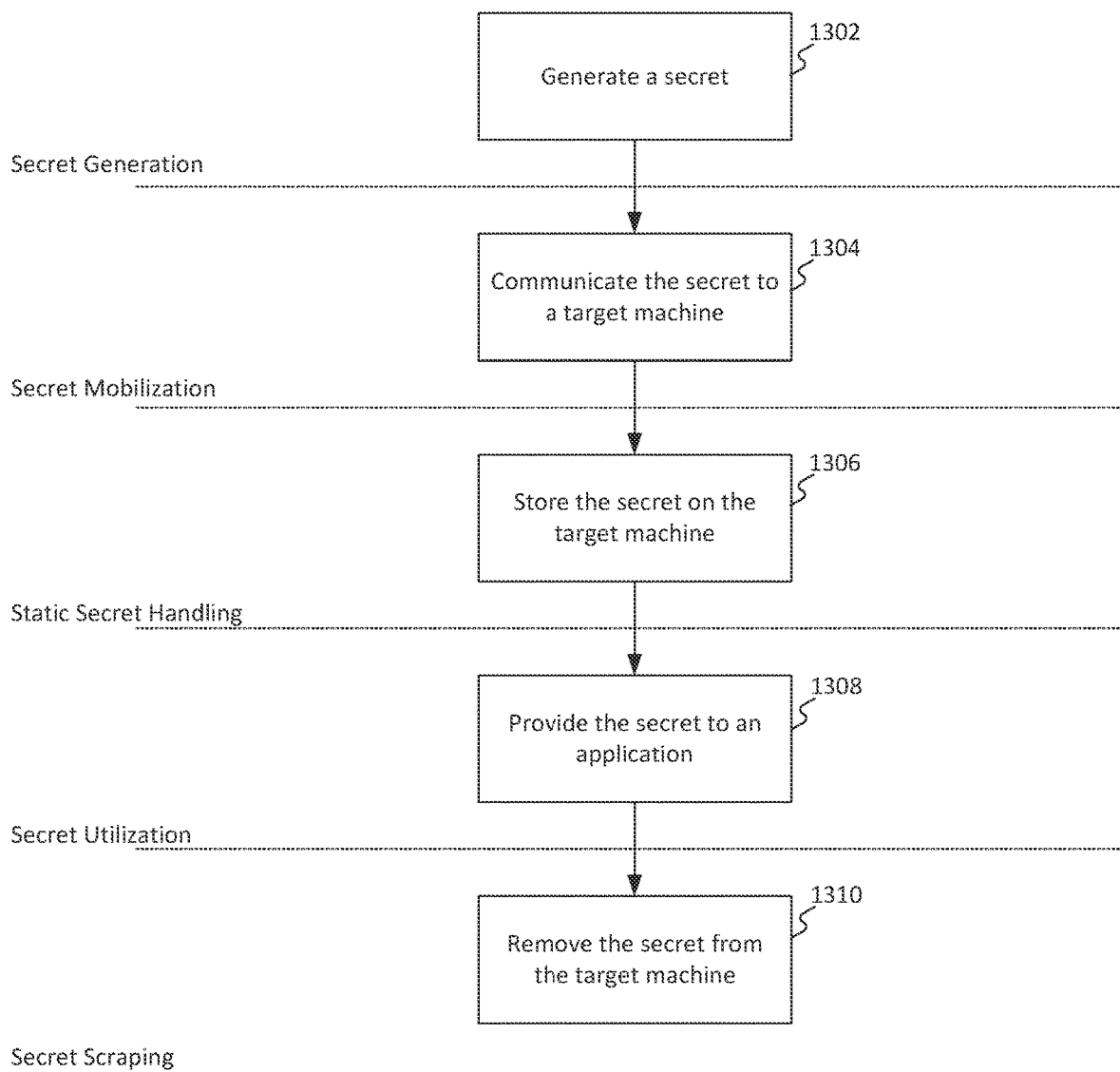
FIG. 13 is a flowchart depicting a secret lifecycle in accordance with disclosed embodiments.

In some embodiments, a system, e.g., asset protection system 1202, may be implemented to manage a secret. For example, a secret may be a credential, password, token, cryptographic key, privileged asset, etc. An exemplary secret lifecycle process 1300 is illustrated in FIG. 13.

In accordance with process 1300, at step 1302 a secret may be generated. For example, the secret may be generated such that it cannot be guessed by an attacker. In some embodiments, secret generation may include creating an encryption key, token, password, or other credential. In some embodiments, a secret may be stored in a file or on a device.

Secret mobilization, at step 1304, may include communicating the secret to a target machine. The target machine may include a security service, e.g., security service 1204, a credential vault, or a secure database, etc. In some embodiments, the secret may be directly be provided to the target machine. Alternatively, in some embodiments the secret may come from a separate resource (e.g., credential vault, such as a CyberArk™ vault). At step 1306, once the secret reaches the target machine, it may be stored and protected before and after it is used. For example, the target machine may store (and optionally encrypt) the secret until it is requested by an authorized process, client device, or user.

In some embodiments, an asset protection system may postpone step 1306 by holding the secret out of reach of the secret-consuming process or application, e.g., as described above with reference to FIG. 12. In some embodiments, the asset protection system may mount the file containing the secret inside the container running the requesting process at the moment that the consuming process requests access to the secret file, as described above. In another embodiment, a secret-file with encrypted content may be stored in a container. The asset protection system may decrypt the secret file and deliver the decrypted content to the consuming process, e.g., when the process calls read( ) syscall. In some embodiments, if environment variables are used to store secrets, the asset protection system may make sure that only approved processes have access to the environment variables. This may be accomplished, in part, by a security service, e.g., security service 1204.

At step 1308, an application or process may read or use the secret stored by the target machine. For example, the application or process may assert the secret as part of an authentication process, an authorization process, or another type of security verification. In some embodiments, a security service and/or asset protection system may manage access to the secret, such that only authorized applications or processes may access or use the secret. In some embodiments, the process may be provided with runtime or just-in-time access to the secret (i.e., the secret is provided on-demand and as-needed for the process, and not before).

In some embodiments, the asset protection system may calculate a signature (e.g., digital or cryptographic signature) of the executable parts of the calling process (e.g., the process requesting access to the secret). Thus, the asset protection system may identify the calling process based on its signature. The signature may include, for example, runtime calls, particular ports accessed by the process, etc. The asset protection system may then lock the memory of that secret-consuming process once the secret has been copied to that process's memory. To protect the secret while the process is running, e.g., at step 1224 of FIG. 12, the asset protection system may prevent the calling process from going into debug mode and may prevent other processes on the machine or in the container from performing read/write/manipulate operations on the process's memory. In some embodiments, the asset protection system may prevent the process's memory, e.g., heap, from being swapped to disk by the kernel.

At step 1310, when the application is done using the secret, access may be cut off or the secret may be removed from the process and the target machine. For example, the asset protection system may remove the secret from the container altogether (e.g., by using an umount( ) command). In other embodiments, e.g., when the container stores an encrypted secret, once the process requiring access to the secret has run, the asset protection system may prevent further access to the secret (e.g., using an env-vars command).

Figure 14:
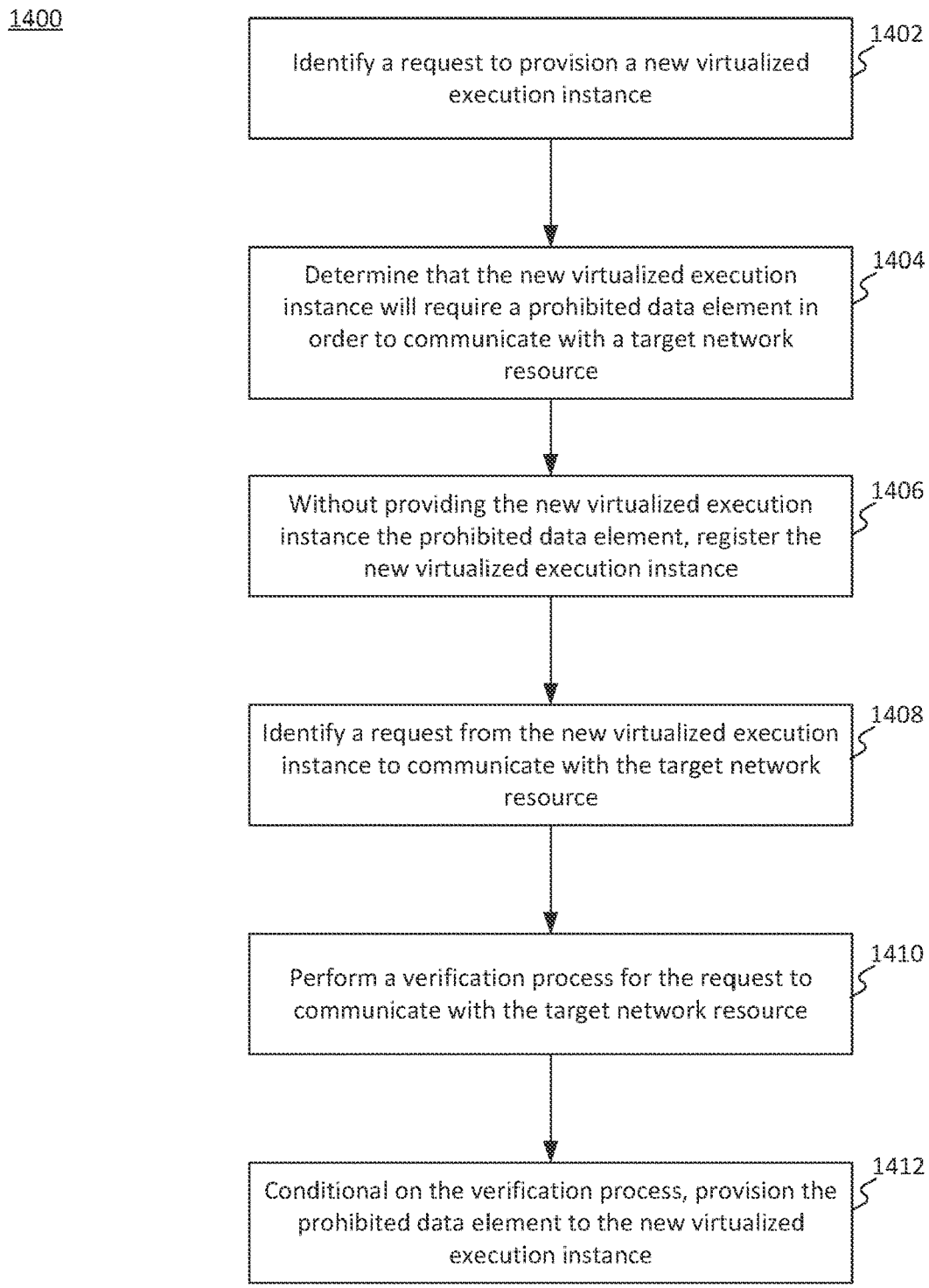
FIG. 14 is a flowchart depicting an exemplary process for securely provisioning sensitive data elements to virtualized execution instances in accordance with disclosed embodiments.

FIG. 14 is a flowchart illustrating a process 1400 for securely provisioning sensitive data elements to virtualized execution instances. In accordance with above embodiments, process 1400 may be performed in the system environments of FIGS. 1, 3-5, 8A-8G, and 9A-9C. For example, process 1400 may be performed by servers 109 of FIG. 1, security server 803 of FIGS. 8A-8G, security server 903 of FIGS. 9A-9C, or security server 1204 or asset protection system 1202 of FIG. 12. In some embodiments, the asset protection system may be a part of a security server such as those described in FIGS. 1, 3-5, 8A-8G, and 9A-9C.

At step 1402, the system may identify a request to provision a new virtualized execution instance. The request may be identified, for example, based on a signature of the process that generated the request. In other embodiments, the request may be received from a client device. The virtualized execution instance may be a container operating on a host or client device.

In some embodiments, the identifying of the request to provision the new virtualized execution instance occurs as part of monitoring requests to instantiate new virtual execution instances. For example, an asset protection system may be configured to monitor requests to instantiate new virtual execution instances. Further in some embodiments operation 1402 may involve monitoring a virtual environment orchestration platform.

At step 1404, the system may determine, in association with the request, that the new virtualized execution instance will require a prohibited data element in order to communicate with a target network resource. The prohibited data element may be, for example, a secret, a file, a directory, or a device, as discussed above. In some embodiments, the system may determine that the new virtualized execution instance will require the prohibited data element by inspecting parameters of the request to provision the new virtualized execution instance. In another embodiment, the system may identify an error associated with an attempt to provision the new virtualized execution instance with the prohibited data element. For example, the error may indicate a request from the process to access a prohibited data element.

At step 1406, without providing the new virtualized execution instance the prohibited data element, the system may register the new virtualized execution instance. For example, the system may initiate a new container or other virtualized instance on a host, e.g., host 1208. Further, the prohibited data element may be included in a registry or list (e.g., maintained by a virtual environment orchestration platform).

At step 1408, the system may identify a request from the new virtualized execution instance to communicate with the target network resource. In some embodiments, identifying the request to provision the new virtualized execution instance may occur as part of a scanning process in a virtualized network environment. In some embodiments, identifying the request from the new virtualized execution instance to communicate with the target network resource may include the asset protection system intercepting the request.

At step 1410, the system may perform a verification process for the request to communicate with the target network resource. In some embodiments, the verification process may include authenticating the new virtualized execution instance. For example, the new virtualized execution instance may be verified by a security service or by the asset protection service. The new virtualized execution instance may be verified based on privileged access rights associated with the new virtualized execution instance.

At step 1412, conditional on the verification process, the system may provision the prohibited data element to the new virtualized execution instance. In some embodiments, provisioning the prohibited data element to the new virtualized execution instance may include mounting the prohibited data element in the new virtualized execution instance. The prohibited data element may be provisioned to the new virtualized execution instance on a just-in-time basis, consistent with above embodiments.

In some embodiments, the system may apply access controls to the new virtualized execution instance while the prohibited data element is provisioned for the new virtualized execution instance. In other embodiments, the system may lock a memory associated with the new virtualized execution instance while the new virtualized execution instance has access to the prohibited data element. Thus, the system may prevent other processes from performing operations on the memory of the process accessing the prohibited data element. The system may also block other processes from accessing the new virtualized execution instance while the new virtualized execution instance has access to the prohibited data element. In some embodiments, the system may prohibit the new virtualized execution instance from entering a debugging mode while the new virtualized execution instance has access to the prohibited data element.

In another embodiment, the system may monitor and audit activities of the new virtualized execution instance while the new virtualized execution instance has access to the prohibited data element. For example, the system may monitor calls made by the new virtualized execution instance to identify a termination of the process accessing the prohibited data element. In other embodiments, the system may record an audit log including, for example, process calls, read/write operations, etc. The audit log may be stored or sent to a system administrator.

As described above, the system may detect a termination of a session between the new virtualized execution instance and the target network resource, and automatically deprovision the prohibited data element for the new virtualized execution instance. For example, the system may detect a termination of a session between the new virtualized execution instance and the target network resource, and unmount the prohibited data element from the new virtualized execution instance. In another embodiment, the system may detect a termination of a session between the new virtualized execution instance and the target network resource, and deny access to the prohibited data element by the new virtualized execution instance.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for identifying vulnerabilities for virtualized execution instances, the operations comprising:
   identifying a virtualized execution instance, before instantiation of the virtualized execution instance, wherein the virtualized execution instance is configured for instantiation in a virtual computing environment;
   performing, before instantiation of the virtualized execution instance, a privileged configuration inspection for the virtualized execution instance, performing the privileged configuration inspection comprising:
      obtaining one or more configuration parameters for the virtualized execution instance;
      determining, based on the obtained one or more configuration parameters, that the virtualized execution instance is permitted to perform operations on a virtualized host environment beyond an environment of the virtualized execution instance, the determination comprising at least one of:
         identifying whether a rights flag is set for the virtualized execution instance,
         identifying whether a permission is granted for the virtualized execution instance, or
         identifying whether secrets or credentials are included in, or accessible to, the virtualized execution instance; and
      determining, based on the determination that the virtualized execution instance is permitted to perform operations on the virtualized host environment beyond the environment of the virtualized execution instance, that the virtualized execution instance presents a privilege vulnerability at least in part by determining that a criterion is satisfied by:
         a one of the one or more configuration parameters,
         a combination of the one or more configuration parameters, or
         a score determined using the one or more configuration parameters; and
   providing, based on the privileged configuration inspection, a notification associated with the privilege vulnerability or the virtualized execution instance.

2. The non-transitory computer readable medium of claim 1, wherein the virtualized execution instance is identified as part of a DevOps, continuous development, or continuous deployment process.

3. The non-transitory computer readable medium of claim 1, wherein the virtualized execution instance is identified by identifying a call to instantiate the virtualized execution instance.

4. The non-transitory computer readable medium of claim 1, wherein the virtualized execution instance is identified by identifying a call to configure the virtualized execution instance.

5. The non-transitory computer readable medium of claim 1, wherein the virtualized execution instance is identified based on a scan of an image of the virtualized execution instance.

6. The non-transitory computer readable medium of claim 1, wherein the virtualized execution instance is identified based on a scan of a development environment that includes the virtualized execution instance.

7. The non-transitory computer readable medium of claim 1, wherein performing the privileged configuration inspection includes using a file system debugger to attempt to access a directory of the host.

8. The non-transitory computer readable medium of claim 1, wherein the operations further comprise, conditional on performing the privileged configuration inspection during a docker phase of the virtualized execution instance, instantiating the virtualized execution instance in the virtual computing environment.

9. The non-transitory computer readable medium of claim 1, wherein the operations further comprise identifying a request to instantiate the virtualized execution instance, and instantiating the virtualized execution instance in the virtual computing environment in response to the request.

10. The non-transitory computer readable medium of claim 1, wherein the virtualized host environment comprises a host kernel and host memory.

11. A computer-implemented method for identifying vulnerabilities for virtualized execution instances, the method comprising:
   identifying a virtualized execution instance, before instantiation of the virtualized execution instance, wherein the virtualized execution instance is configured for instantiation in a virtual computing environment;
   performing, before instantiation of the virtualized execution instance, a privileged configuration inspection for the virtualized execution instance, performing the privileged configuration inspection comprising:
      obtaining one or more configuration parameters for the virtualized execution instance;
      determining, based on the obtained one or more configuration parameters, that the virtualized execution instance is permitted to perform operations on a virtualized host environment beyond an environment of the virtualized execution instance, the determination comprising at least one of:
         identifying whether a rights flag is set for the virtualized execution instance,
         identifying whether a permission is granted for the virtualized execution instance, or
         identifying whether secrets or credentials are included in, or accessible to, the virtualized execution instance; and determining, based on the determination that the virtualized execution instance is permitted to perform operations on the virtualized host environment beyond the environment of the virtualized execution instance, that the virtualized execution instance presents a privilege vulnerability at least in part by determining that a criterion is satisfied by:
- a one of the one or more configuration parameters,
- a combination of the one or more configuration parameters, or
- a score determined using the one or more configuration parameters; and providing, based on the privileged configuration inspection, a notification associated with the privilege vulnerability or the virtualized execution instance.

12. The computer-implemented method of claim 11, wherein the configuration parameters comprise a privileged rights flag.

13. The computer-implemented method of claim 11, wherein the configuration parameters comprise an identification of a privileged access credential.

14. The computer-implemented method of claim 11, wherein the configuration parameters comprise a device flag.

15. The computer-implemented method of claim 11, wherein the configuration parameters comprise a capabilities flag.

16. The computer-implemented method of claim 11, wherein the configuration parameters comprise a volume mount flag.

17. The computer-implemented method of claim 11, wherein the notification includes a prompt for authentication before the virtualized execution instance can be instantiated in the virtual computing environment.

18. The computer-implemented method of claim 11, wherein the notification includes a selectable option for controlling whether to instantiate the virtualized execution instance.

19. The computer-implemented method of claim 11, wherein the notification includes a selectable option for monitoring the virtualized execution instance after instantiation.

20. The computer-implemented method of claim 11, wherein the notification includes a selectable option for disallowing access to a privileged credential by the virtualized execution instance.

* * * * *